US011840051B2

(12) United States Patent
O'Donnell et al.

(10) Patent No.: US 11,840,051 B2
(45) Date of Patent: Dec. 12, 2023

(54) APPARATUS AND METHOD FOR INSTALLING A SCREEN PROTECTOR ON AN ELECTRONIC DEVICE

(71) Applicant: Curio Holding Company, Philadelphia, PA (US)

(72) Inventors: Dennis O'Donnell, Philadelphia, PA (US); Phillip Chang, Philadelphia, PA (US)

(73) Assignee: Curio Holding Company

( * ) Notice: Subject to any disclaimer, the term of this patent is extended or adjusted under 35 U.S.C. 154(b) by 259 days.

(21) Appl. No.: 17/512,848

(22) Filed: Oct. 28, 2021

(65) Prior Publication Data

US 2022/0134725 A1 May 5, 2022

Related U.S. Application Data

(60) Provisional application No. 63/108,974, filed on Nov. 3, 2020.

(51) Int. Cl.
*B32B 37/00* (2006.01)
*B32B 37/10* (2006.01)
(Continued)

(52) U.S. Cl.
CPC .......... *B32B 37/0053* (2013.01); *B32B 37/10* (2013.01); *B29C 63/0047* (2013.01);
(Continued)

(58) Field of Classification Search
CPC ... B32B 37/003; B32B 37/0046; B32B 37/10; B32B 2457/20–208; B29C 66/342;
(Continued)

(56) References Cited

U.S. PATENT DOCUMENTS 7,784,610 B2   8/2010  Mason
8,369,072 B1   2/2013  Alonzo et al.
(Continued)

FOREIGN PATENT DOCUMENTS

CN   204197462       3/2015
CN   206520789       9/2017
WO   WO2018/177590 A1   10/2018

OTHER PUBLICATIONS

Belkin Website: TrueClear Pro Advanced Screen Care; https://www.belkin.com/in/screen-protectors/screenforce-application-system/p/p-p00553/, Retrieved Oct. 28, 2021; pp. 1-7.
(Continued)

*Primary Examiner* — Carson Gross
(74) *Attorney, Agent, or Firm* — The Belles Group, P.C.

(57) ABSTRACT

An apparatus and/or method for installing a screen protector on an electronic device, for example using a wet application process. The apparatus includes a support member for supporting the electronic device and a clamp mechanism for clamping the electronic device in a fixed position on the support member. A tack assembly is used to tack the screen protector to the electronic device. The tack assembly includes an actuator that, once actuated, causes a tack member to apply a force onto the screen protector which tacks the screen protector to the electronic device and prevents misalignment. Finally, a roller assembly is actuated so that a roller member moves across the screen protector to bond the screen protector to the electronic device and remove any excess liquid that may exist between the screen protector and the electronic device.

19 Claims, 17 Drawing Sheets

(51) Int. Cl.
*B29C 63/00* (2006.01)
*B29C 65/00* (2006.01)
*B29C 63/02* (2006.01)

(52) U.S. Cl.
CPC ............ *B29C 63/02* (2013.01); *B29C 66/342* (2013.01); *B29C 66/345* (2013.01); *B29C 2063/0008* (2013.01); *B32B 37/003* (2013.01); *B32B 37/0046* (2013.01); *B32B 2457/20* (2013.01)

(58) Field of Classification Search
CPC ... B29C 66/345; B29C 63/0047; B29C 63/02; B29C 2063/027; B29C 2063/0008; B29L 2031/3437
See application file for complete search history.

(56) References Cited

U.S. PATENT DOCUMENTS

| | | |
|---|---|---|
| 8,517,367 B1 | 8/2013 | Napier |
| 9,588,547 B2 | 3/2017 | Witham |
| 9,641,209 B2 | 5/2017 | Roberts et al. |
| 10,076,872 B2 | 9/2018 | Witham |
| 10,744,705 B2 | 8/2020 | Cho et al. |
| 10,782,746 B2 * | 9/2020 | Kleeman ............... B32B 38/10 |
| 10,841,409 B2 | 11/2020 | Bulkley et al. |
| 2013/0199714 A1 | 8/2013 | Patel |
| 2013/0199950 A1 | 8/2013 | Feller |
| 2014/0130971 A1 | 5/2014 | Wu et al. |
| 2015/0013890 A1 | 1/2015 | Rostami |
| 2015/0183201 A1 | 7/2015 | Cohen et al. |
| 2020/0198223 A1 * | 6/2020 | Sorensen ............... B32B 41/00 |
| 2020/0368974 A1 * | 11/2020 | Choung ............. B29C 65/1406 |
| 2022/0063181 A1 * | 3/2022 | Song ...................... B29C 63/02 |

OTHER PUBLICATIONS

YouTube Website: Belkin Screen Protector Applicator Machine; https://www.youtube.com/watch?v=y7uz2M8pT-g; Retrieved Oct. 28, 2021; pp. 1-3.
Amazon Website: https://www.amazon.com/PureGear-Clarity-Tempered-Protection-Installation/dp/B076FGR4SY/ref=sr_1_15?dchild=1&keywords=puregear&qid=1603849624&sr=8-15; Retrieved Oct. 28, 2021; pp. 1-8.

* cited by examiner

APPARATUS AND METHOD FOR INSTALLING A SCREEN PROTECTOR ON AN ELECTRONIC DEVICE

CROSS REFERENCE TO RELATED APPLICATIONS

The present application claims the benefit of U.S. Provisional Patent Application Ser. No. 63/108,974, filed on Nov. 3, 2020, the entirety of which is incorporated herein by reference.

BACKGROUND

Electronic devices, and more specifically handheld mobile devices such as tablets, phones, personal digital assistants, etc., often have a touchscreen which is prone to scratching, damage, cracking, and breakage. As a result, screen protectors are often employed after purchase of the device as an aftermarket solution to protect the screen from damage. These screen protectors range in material and form, from glass, to many different types of plastics, such as PET, PMMA, and TPU. The installation of these screen protectors is often an issue. Specifically, due to the exact dimensions of touchscreens, the screen protector must be affixed in perfect alignment with the screen, and the installation must be free of dust, bubbles, and other contaminants that prevent a perfect lamination between the protector and the screen.

Screen protectors are sometimes affixed with a dry application adhesive, such as silicone, which will "wet out" on the screen without the use of any liquids. The problem with these types of adhesives is that dust will often become trapped during installation, causing visual issues for the user. This application method is, however, very easy and simple. Other screen protectors are affixed using a wet application adhesive, such as an acrylic adhesive. These adhesives are very tacky, and therefore, to aid in installation, a water based application liquid is often employed. This eliminates the possibility of incorrect alignment, dust, and bubbles and is the preferred installation method for highest quality installation. However, this method is also the most difficult for the operator who often needs to practice this installation method many times before becoming skilled at it. The present invention is directed to a device that aids in the installation of a screen protector using the wet application method while reducing the skill required during the application process so that any user, without previous training, can install wet application screen protectors very quickly, easily, and with flawless results.

BRIEF SUMMARY

The present invention is directed to an apparatus and/or method for installing a screen protector on an electronic device, and is specifically directed to the installation of a screen protector using a wet application process. The apparatus includes a support member for supporting the electronic device and a clamp mechanism for clamping the electronic device in a fixed position on the support member. A tack assembly is used to tack the screen protector to the electronic device. The tack assembly includes an actuator that, once actuated, causes a tack member to apply a force onto the screen protector which tacks the screen protector to the electronic device and prevents misalignment. Finally, a roller assembly is actuated so that a roller member moves across the screen protector to bond the screen protector to the electronic device and remove any excess liquid that may exist between the screen protector and the electronic device.

In one aspect, the invention may be an apparatus for installing a screen protector on an electronic device, the apparatus comprising: a support member comprising an upper support surface extending along a longitudinal axis for supporting an electronic device thereon and a stopper located at a top end of the upper support surface; a clamp mechanism slidably coupled to the support member to clamp the electronic device between the clamp mechanism and the stopper; a tack assembly comprising a housing having a cavity and a bottom end with an opening, a tack member positioned in the housing, and a release mechanism that supports the tack member in an elevated position within the cavity of the housing, wherein the tack assembly is rotatable relative to the support member between a first position whereby the tack assembly is not aligned with the upper support surface of the support member and a second position whereby the tack assembly is aligned with a portion of the upper support surface of the support member, and wherein upon actuating the release mechanism while the tack assembly is in the second position the tack member falls downwardly within the cavity until a portion of the tack member protrudes through the opening in the bottom end of the housing; and a roller assembly comprising a roller member and an actuator, wherein actuation of the actuator causes the roller member to move along the upper support surface of the support member in a direction of the longitudinal axis.

In another aspect, the invention may be an apparatus for installing a screen protector on an electronic device, the apparatus comprising: a base assembly comprising a support member having an upper support surface configured to support an electronic device; a clamp mechanism configured to hold the electronic device in a fixed position on the support member; a tack assembly movably coupled to the base assembly between a non-use position and a use position, the tack assembly comprising a tack member and a release mechanism that is detachably coupled to the tack member, wherein the release mechanism is alterable between: (1) a non-actuated state in which the release mechanism engages and supports the tack member; and (2) an actuated state in which the release mechanism disengages from the tack member, and wherein when the electronic device with a screen protector positioned thereon is supported on the upper support surface of the support member and the tack assembly is in the use position, altering the release mechanism from the non-actuated state to the actuated state causes the tack member to fall vertically downward into contact with the screen protector to tack the screen protector to the electronic device; and a roller assembly comprising a roller member and an actuator, wherein actuation of the actuator causes the roller member to move along and apply a downward force onto the screen protector of the electronic device positioned on the upper support surface of the support member.

In yet another aspect, the invention may be an apparatus for installing a screen protector on an electronic device, the apparatus comprising: a support member comprising an upper support surface configured to support an electronic device; a clamp mechanism configured to hold the electronic device in a fixed position on the support member a tack assembly comprising a tack member and an actuator, wherein when the electronic device with a screen protector positioned thereon is supported on the upper support surface of the support member, actuating the actuator of the tack assembly causes the tack member to apply a perpendicular force onto the screen protector to tack the screen protector to the electronic device; and a roller assembly comprising a roller member and an actuator, wherein actuation of the actuator causes the roller member to move along and apply a downward force onto the screen protector of the electronic device positioned on the upper support surface of the support member.

In a further aspect, the invention may be a method of installing a screen protector on an electronic device, the method comprising: placing a screen protector onto a screen of an electronic device; positioning the electronic device on an upper support surface of a support member; moving a tack assembly from a non-use position to a use position so that a tack member of the tack assembly is positioned above and in alignment with at least a portion of the screen protector; actuating a release mechanism of the tack assembly to disengage the release mechanism from the tack member and cause the tack member to fall into contact with the screen protector, thereby tacking the screen protector to the screen of the electronic device; moving the tack assembly from the use position to the non-use position; and actuating an actuator of a roller assembly so that a roller member of the roller assembly moves along the screen protector while applying a downward force onto the screen protector to remove any liquid between the screen protector and the screen of the electronic device and bond the screen protector to the screen of the electronic device.

In a still further aspect, the invention may be a method of installing a screen protector on an electronic device, the method comprising: placing a screen protector onto a screen of an electronic device; positioning the electronic device on an upper support surface of a support member; applying a vertical downward force onto the screen protector with a tack member thereof to tack the screen protector to the screen of the electronic device; and moving a roller member along the screen protector while applying a downward force onto the screen protector to remove any liquid between the screen protector and the screen of the electronic device and bond the screen protector to the screen of the electronic device.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWING

The present invention will become more fully understood from the detailed description and the accompanying drawings, wherein.

DETAILED DESCRIPTION

Figure 1:
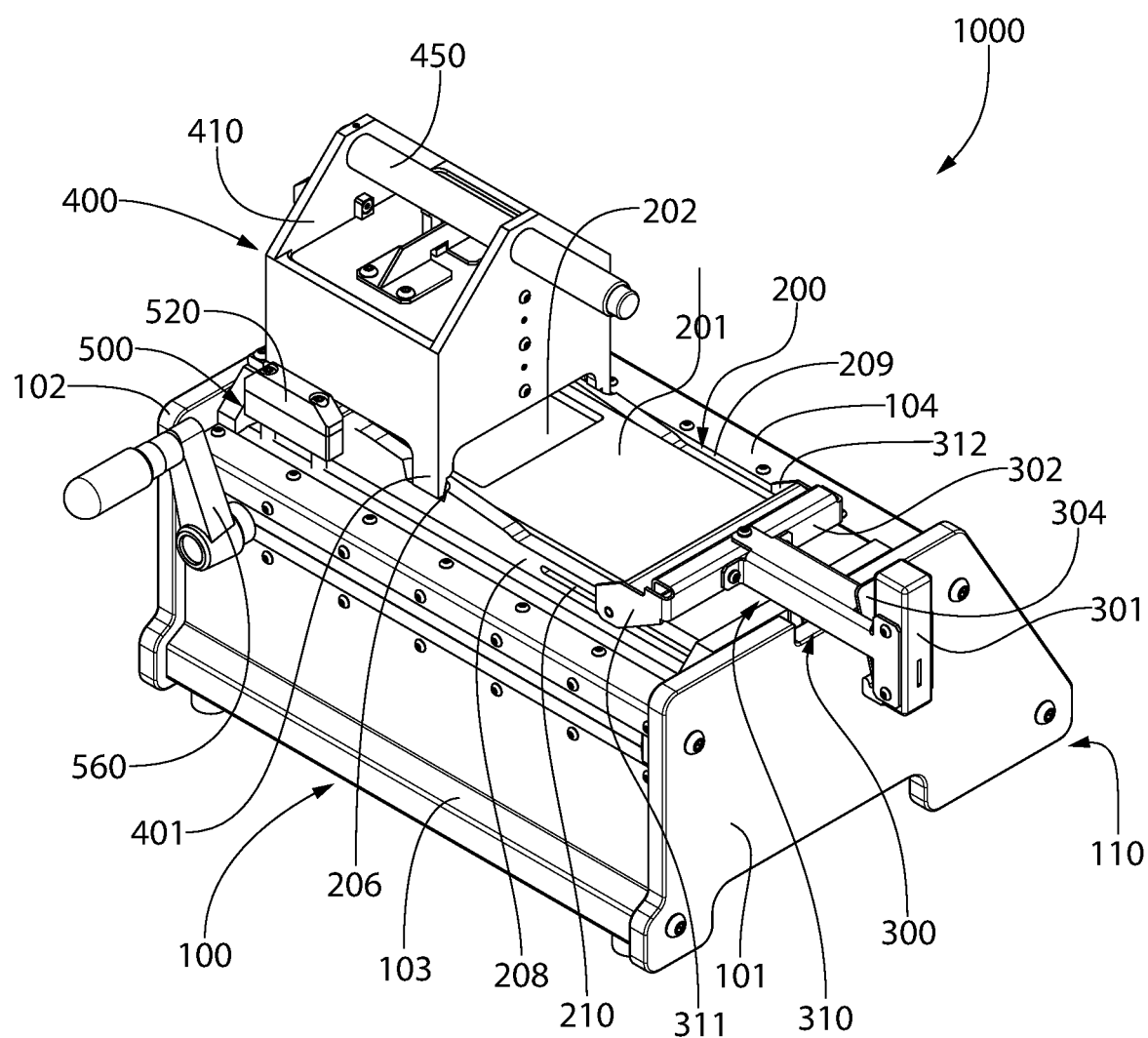
FIG. 1 is a front perspective view of an apparatus for installing a screen protector on an electronic device in accordance with an embodiment of the present invention.

The following description is merely exemplary in nature and is in no way intended to limit embodiments of the invention, their applications, or uses. As used throughout, ranges are used as shorthand for describing each and every value that is within the range. Any value within the range can be selected as the terminus of the range. In addition, all references cited herein are hereby incorporated by reference in their entireties. In the event of a conflict in a definition in the present disclosure and that of a cited reference, the present disclosure controls.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top," and "bottom" as well as derivatives thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such.

Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features, the scope of the invention being defined by the claims appended hereto.

Referring first to FIGS. 1-4, an apparatus 1000 for installing a screen protector on an electronic device is illustrated and will be described. The apparatus 1000 is universal in that it can be used to install a screen protector on almost any phone of any size. Furthermore, the apparatus 1000 is robust and therefore constructed to be able to perform thousands if not tens of thousands of installations. Thus, the apparatus 1000 is built more like an industrial machine than a cheap single use screen protector installation device. The apparatus 1000 is precise, accurate, and effective at installing protective screens on electronic devices without air bubbles, misalignment, or other issues that impact installation. Furthermore, the apparatus 1000 is very easy to use and an operator will be able to successfully install a screen protector on an electronic device using the apparatus 1000 without any formal training any without having to perform many practice runs, if any.

In some embodiments, the apparatus 1000 may be specifically tailored for installing screen protectors on electronic devices (e.g., smart phones, tablets, PDAs, etc.) using a wet application process. In a wet application process, a user cleans the screen of the electronic device, peels a protective mask film from the bottom surface of the screen protector, and then liberally applies a solution onto the adhesive side of the screen protector and possibly also onto the screen of the electronic device. Next, the user places the screen protector on the device with the adhesive side down and adjusts until it is properly aligned. However, at this point the screen protector is not bonded to the electronic device due to the liquid located between the adhesive on the screen protector and the screen of the electronic device. Thus, users are required to use squeegees or other devices to squeeze the liquid out from underneath the screen protector and take other actions to remove all of the liquid at the edges in order to adequately bond the screen protector to the electronic device. Manually applying a screen protector to an electronic device using a wet installation process is not a simple process and may result in the screen protector being misaligned on the electronic device, bubbles remaining between the screen protector and the electronic device, corners/edges of the screen protector not adequately bonding to the electronic device, and the like. The apparatus 1000 described herein makes the installation process much more seamless, consistent, and effective.

The apparatus 1000 generally comprises a base assembly 100, a support member 200, a clamp mechanism 300, a tack assembly 400, and a roller assembly 500 operate to securely hold an electronic device and bond a protective film thereto. In some embodiments, the base assembly 100 may be deemed to be a part of the support member 200, and vice versa. That is, as described herein, the base assembly 100 comprises a base unit 110 the support member 200.

The base unit 110 of the base assembly 100 comprises a pair of front walls 101, a pair of rear walls 102, a first side wall 103, and a second side wall 104 that collectively define an interior chamber 105 (see FIG. 7) when assembled. The pair of front and rear walls 101, 102 each comprises an inner wall that bounds and faces the interior cavity 105 and an outer wall attached to the outer surface of the inner wall with the outer wall forming a part of the outer surface of the base unit 110. Although there are a pair of the front and rear walls 101, 102 in the exemplified embodiment, the invention is not to be so limited in all embodiments and there could just be one front wall 101 and one rear wall 102 in other embodiments. In some embodiments, the components of the base unit 110 may be formed from metal, although the invention is not to be so limited and plastic or other rigid and robust materials could be used in other embodiments. Screws or other fasteners may be used to connect the various walls of the base unit 110 together. The front and rear walls 101, 102 and the first and second side walls 103, 104 have various notches, cut-outs, slots, and fastener receiving holes that facilitate the coupling of the various walls 101-104 to one another. Moreover, the notches, cut-outs, and slots enable other structures/components to be attached to the walls 101-104 and/or provide clearance for other components to move via sliding, rotation, translation, or the like relative to the base assembly 100.

The support member 200 is supported in an elevated position by the base unit 110 of the base assembly 100. That is, the support member 200 is held by or attached to the base unit 110 along a top end of the various walls 101-104 thereof to enclose a top end of the interior chamber 105 which is formed by the base assembly 100. The support member 200 is the component of the apparatus 1000 which is configured to support the electronic device during the screen protection installation process. The support member 200 may be retained within slots or channels formed into the various walls (such as the elongated slots 111 in the first and second side walls 103, 104 shown in FIG. 4) without having a physical connection between the support member 200 and the base unit 110 via fasteners. In other embodiments, fasteners such as screws or the like may be used to affix the support member 200 to the base unit 110.

The support member 200 comprises an upper support surface 201 that extends along a longitudinal axis A-A. The upper support surface 201 is the surface upon which the electronic device is positioned during a screen protector installation process. The upper support surface 201 may be formed of a grippy material so that when an electronic device is positioned thereon the electronic device does not readily slide or move on the upper support surface 201. Rather, the grippy material of the upper support surface 201 generates sufficient friction between the electronic device and the upper support surface 201 to generally prevent or minimize any movement of the electronic device when supported thereon. The grippy material may be a resilient material, a rubber, or even a soft plastic. The grippy material may be any material of suitable softness and grip to minimize or prevent movement of an electronic device when supported thereon. In one embodiment, the grippy material may be silicone. In some embodiments, the grippy material may have a Shore hardness of 60A or an engineering equivalent, or the hardness may be selected from a Shore hardness range of from 60 00 to 60D The upper support surface 201 of the support member 200 may comprise a recess 202. In the exemplified embodiment, the recess 202 is in the shape of a square or a rectangle, although the invention is not to be so limited in all embodiments. The recess 202 may take on other shapes, including being circular or any other shape that enables it to achieve the purpose described herein. That is, when an electronic device is positioned on the upper support surface 201 of the support member 200, the electronic device is positioned face up so that the rear or back surface of the electronic device is in direct physical contact with the upper support surface 201 of the support member 200. In many instances, electronic devices (such as smart phones) have cameras or other features on their rear surfaces, and these cameras or other features protrude or stick out from the rear surface. Thus, without the recess 202, positioning the electronic device with its rear surface down would result in the electronic device not being maintained in a level horizontal orientation, which is desirable for a proper protective screen installation. Thus, the recess 202 is sized and positioned so that it will receive any cameras or other protruding features that protrude from the rear surface of the electronic device. Because the apparatus 100 is designed to work with different types and sizes of electronic devices, the recess 202 is sized and configured to receive protruding features on all such electronic devices. When the electronic device is positioned on the upper support surface 201 of the support member 200, the features which protrude from the rear surface of the electronic device nest within the recess 202.

The support member 200 comprises a stopper 203 located at a top end of the upper support surface 201. In the exemplified embodiment, the stopper 203 is an upstanding wall that extends upwardly from the upper support surface 201. The stopper 203 may be formed from a resilient material, such as a rubber or the like having a Shore hardness of 60A. Of course, other materials and hardnesses may be used in other embodiments. In some embodiments, the stopper 203 may even be formed of a hard plastic. Moreover, while the stopper 203 is illustrated as an upstanding wall in the exemplified embodiment, the invention is not to be so limited in all embodiments of the present invention. That is, in other embodiments the stopper 203 may comprise spaced apart vertical extensions or rods that extend upwardly from the upper support surface 201 of the support member 200. In any case, the stopper 203 is configured to form a backstop for the positioning of the electronic device on the upper support surface 201 of the support member 200. When the electronic device is positioned on the upper support surface 201, the top end or top edge of the electronic device should abut against the stopper 203. This will ensure that any protruding features on the rear surface of the electronic device are located within the recess 202 as discussed above while also facilitating the clamping of the electronic device in place as will be described below.

The support member 200 also comprises first and second ramped walls 204, 205 that partially bound first and second opposing sides of the support member 200. In particular, the support member 200 comprises the first ramped wall 204 that at least partially bounds a first side of the upper support surface 201 and the second ramped wall 205 that at least partially bounds a second side of the upper support surface 201 that is on an opposite side of the longitudinal axis A-A than the first side of the upper support surface 201. Each of the first and second ramped walls 204, 205 may be inclined upwardly in a direction towards the top end (and the stopper 203) of the upper support surface 201. Stated the opposite way, the first and second ramped walls 204, 205 are inclined downwardly with increasing distance from the stopper 203. The first and second ramped walls 204, 205 provide a surface upon which a roller member of the roller assembly 500 moves during the final step in the installation process, which will be discussed in greater detail below.

Figure 2:
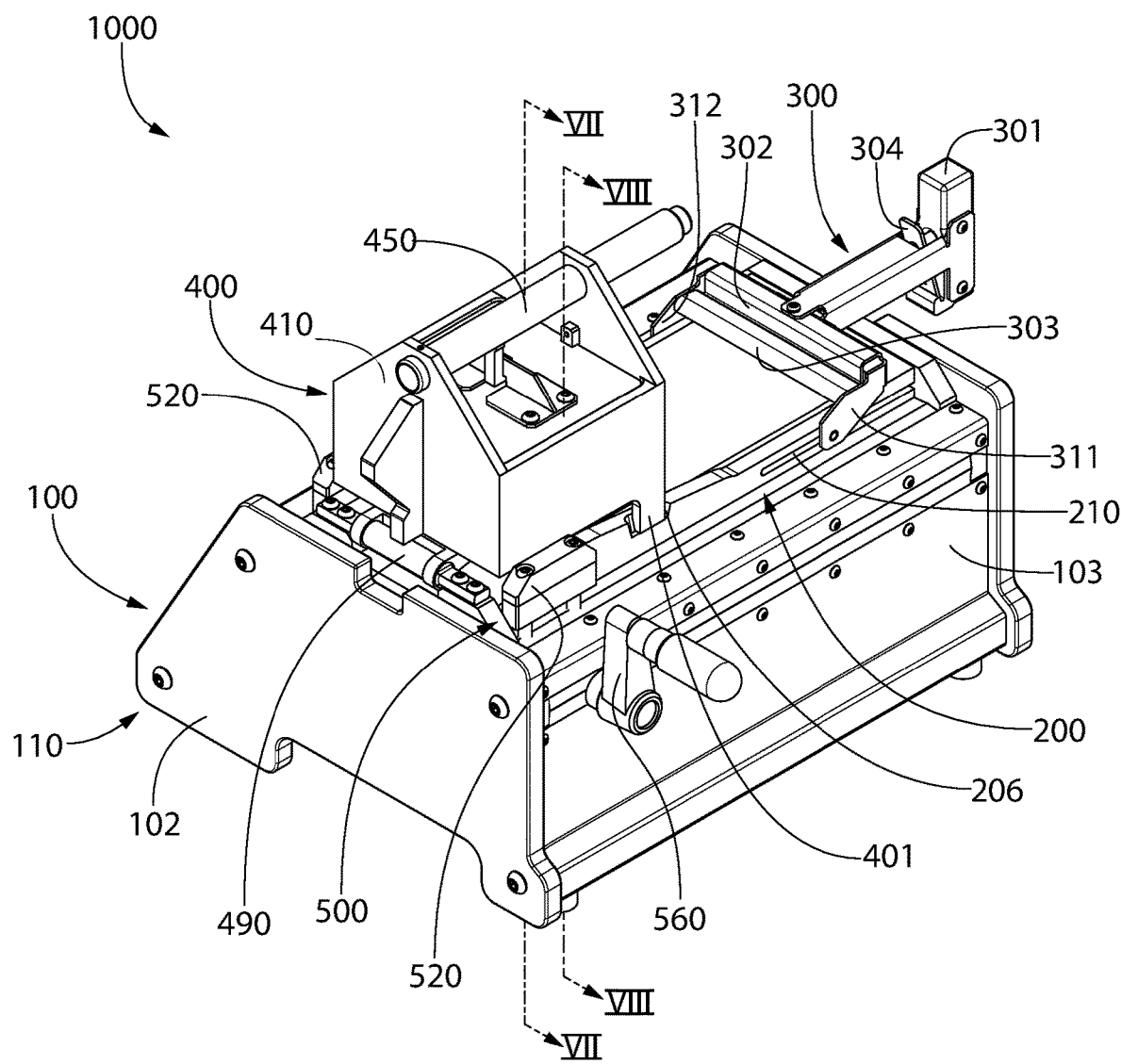
FIG. 2 is a rear perspective view of the apparatus of FIG. 1.

The first ramped wall 204 comprises a first receiving notch 206 and the second ramped wall 205 comprises a second receiving notch 207. The first and second receiving notches 206, 207 are configured to receive legs 401 of the tack assembly 400 when the tack assembly 400 is in a use position, as shown in FIGS. 1 and 2. In other embodiments, the first and second receiving notches 206, 207 may be omitted and the legs 401 or other features of the tack assembly 400 may simply rest atop of the distal ends of the first and second ramped walls 204, 205 when in the use position.

Finally, the support member 200 comprises a first side surface 208 and a second side surface 209. The first side surface 208 is formed by the outer surface of the first ramped wall 204 and the second side surface 209 is formed by the outer surface of the second ramped wall 205. The first side surface 208 comprises a first elongated groove 210 that extends from a bottom end of the support member 200 in a direction towards the top end of the support member 200. The second side surface 209 comprises a second elongated groove (not visible in the figures, but identical to the first elongated groove 210) that extends from the bottom end of the support member 200 in a direction toward the top end of the support member 200. The first and second elongated grooves 210 only extend along a portion of the length of the support member 200 in the exemplified embodiment. The first and second elongated grooves 210 are configured to permit coupling of the clamp mechanism 300 to the support member 200 and sliding movement of the clamp mechanism 300 relative to the support member 200, as discussed in more detail below.

With reference to FIGS. 1-5, the clamp mechanism 300 will now be described. As noted above, the clamp mechanism 300 is configured to clamp electronic devices of various size into a fixed position on the support member 200. Specifically, the clamp mechanism 300 is configured to move forward and backward in the direction of the longitudinal axis A-A of the support member 200 to securely clamp the electronic device between the distal end of the clamp mechanism 300 and the stopper 203, regardless of the size/length of the electronic device. The clamp mechanism 300 generally comprises a clamping structure 310 comprising handle portion 301 and a distal portion 302 that terminates in a distal end 303 of the clamp mechanism 300. Furthermore, the clamp mechanism 300 comprises a trigger 304 that is alterable between a locked state and an unlocked state. The trigger 304 is biased into the locked state by a biasing member 305, which is a spring in the exemplified embodiment, but may take on other forms in other embodiments such as being a compressible material, a resilient member, or the like.

The clamp mechanism 300 further comprises an elongated bar 306 upon which the clamping structure 310 moves between its various positions. The elongated bar 306 is coupled to an inner wall of the pair of front walls 101. In particular, the inner wall of the pair of front walls 101 comprises a slot 115 that extends from its top edge downwardly for a distance that is less than a length of the inner wall of the pair of front walls 101. The elongated bar 306 is positioned within the slot 115 and is clamped thereto using a fastener such as a set screw or the like. However, the invention is not to be limited to the manner of attachment of the elongated bar 306 to the base assembly 100. Thus, the elongated bar 306 may be coupled to the outer wall of the pair of front walls 101 or to any other structure of the base assembly 100 using any of a variety of techniques.

Figure 7:
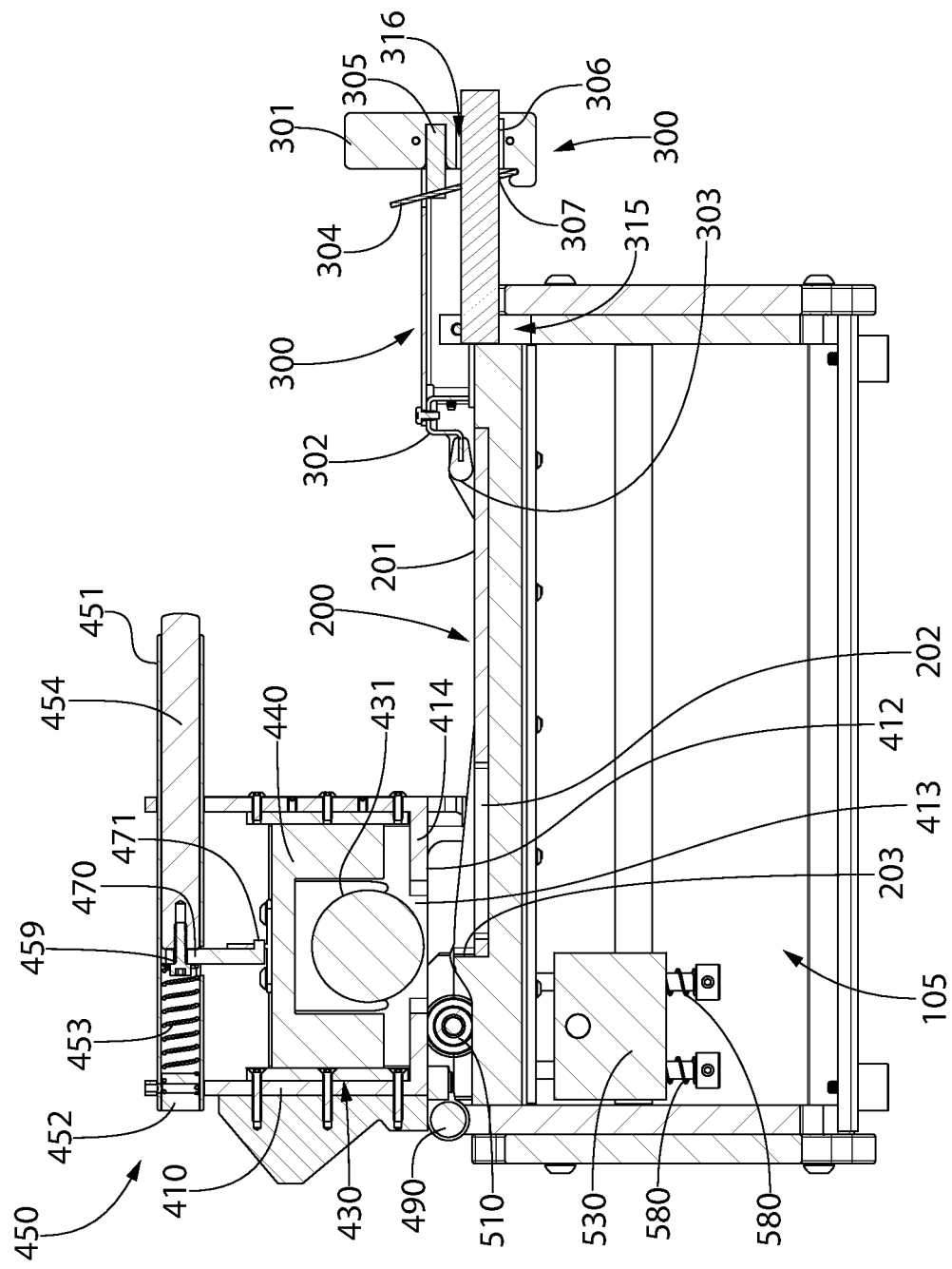
FIG. 7 is a cross-sectional view taken along line VII-VII of FIG. 2.

In the exemplified embodiment the elongated bar 306 is fixed to the inner wall of the pair of front walls 101 within the slot 115 and the elongated bar 306 extends through an elongated slot 307 (see FIG. 7) in the trigger 304. Furthermore, the handle portion 301 of the clamping structure 310 comprises a passageway 316 through which the elongated bar 306 can pass through the thickness of the handle portion 301 as the clamping structure 310 moves axially along and relative to the elongated bar 306. The biasing member 305 biases the trigger 304 into the locked state, wherein an edge of the trigger 304 that bounds the elongated slot 307 is forced into frictional engagement with the elongated bar 306 (FIG. 7). The frictional engagement between the trigger 304 and the elongated bar 306 prevents, or at a minimum inhibits, the ability to move the clamping structure 310 of the clamp mechanism 300 relative to the elongated bar 306. Thus, in the exemplified embodiment the clamp mechanism 300 self-tightens or self-locks by the use of friction. It should be appreciated that the invention is not to be limited to this type of a locking mechanism for the clamp mechanism 300 in all embodiments. For example, in other embodiments the clamp mechanism 300 may be locked using electromechanics such as servos, via springs, hydraulic pistons, a ratcheting system, or the like.

Figure 11:
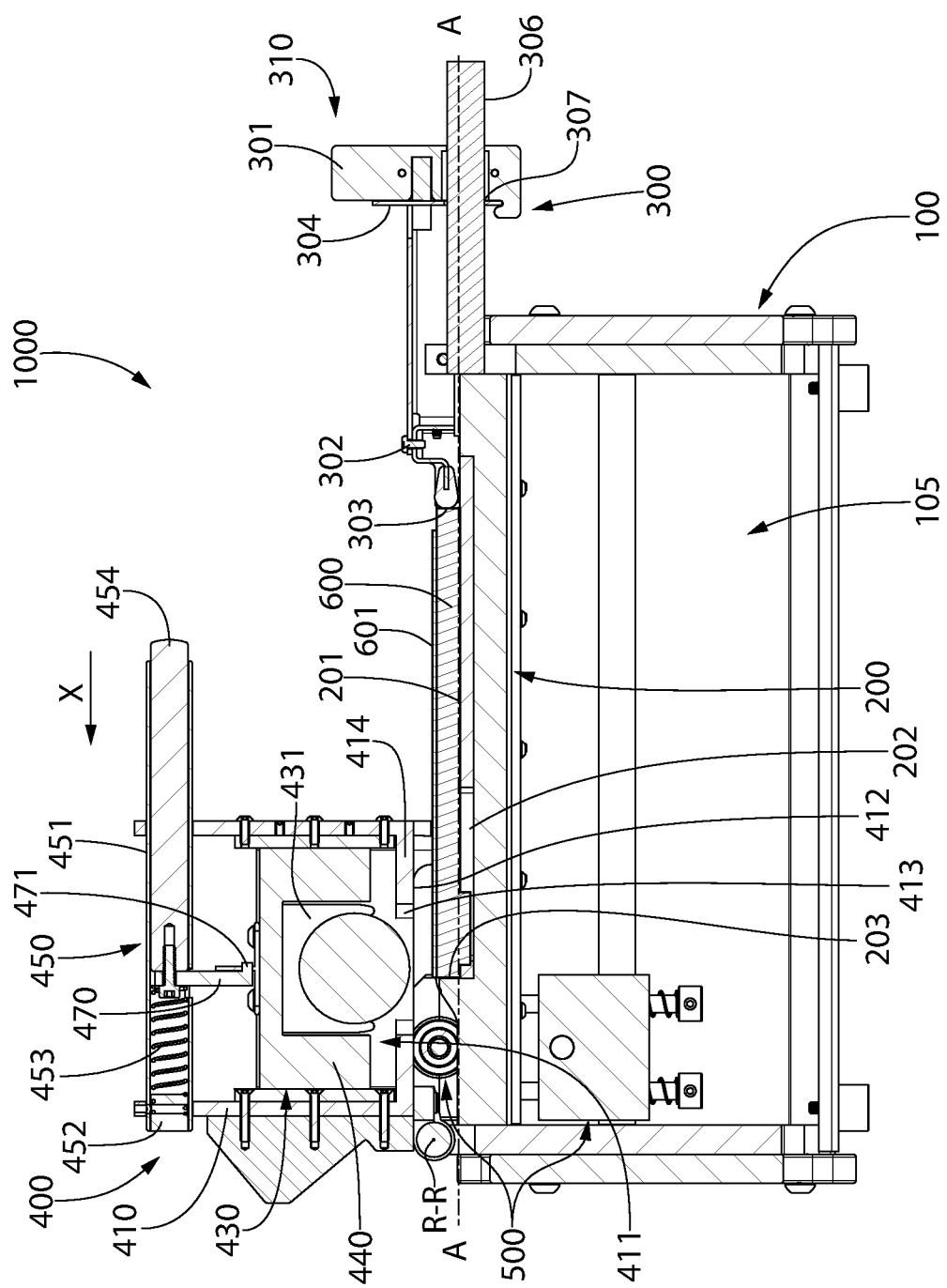
FIG. 11 is the cross-sectional view of FIG. 10 with the clamp mechanism having been moved to clamp the electronic device on the support member.

To alter the clamp mechanism 300 from the locked state to the unlocked state, a user actuates the trigger 304 by pressing the top part of the trigger 304 inwardly in a direction away from the distal portion 302 of the clamping structure 210 (see FIG. 11). This causes the trigger 304 to pivot so that it becomes disengaged from contact with the elongated bar 306. As such, when the trigger 304 is actuated, the clamping structure 310 is able to slide forward and backward along the elongated bar 306 in the direction of the longitudinal axis A-A of the support member 200. Depending on the size of the electronic device placed on the support structure 200, the operator may adjust the position of the clamping structure 310 of the clamping mechanism 300 relative to the elongated bar 306 and to the support member 200 so that the distal end 303 of the clamping mechanism 300 contacts/engages the bottom end of the electronic device. This fixedly clamps the electronic device between the distal end 303 of the clamping mechanism 300 and the stopper 203 of the support member 200. Once the clamp mechanism 300 has been moved/slid to the desired position, the trigger 304 is released and biased back into the locked state such that the trigger 304 reengages with the elongated bar 306, thereby locking the clamp mechanism 300 in place.

The distal portion 302 of the clamping structure 310 comprises a first engagement arm 311 having a first connection element on its inner surface and a second engagement arm 312 having a second connection element on its inner surface. The first engagement arm 311 is positioned adjacent to the first side surface 208 of the support member 200 and the second engagement arm 312 is positioned adjacent to the second side surface 209 of the support member 200. Furthermore, the first and second connection elements are male features, such as protuberances or the like, that protrude from the inner surfaces of the first and second engagement arms 311, 312, respectively. Thus, the first connection element extends into the first elongated groove 210 formed into the first side surface 208 of the support member 200 and the second connection element extends into the second elongated groove formed into the second side surface 209 of the support member 200. Of course, in other embodiments there could be grooves on the inner surfaces of the first and second engagement arms 311, 312 and the first and second side surfaces 208, 209 of the support member 200 may comprise male protuberances that mate with the grooves. As the clamp mechanism 300 slides relative to the support member 200, the first and second connection elements slide within the first and second elongated grooves 210 which helps to maintain the clamp mechanism 300 in proper position and alignment relative to the support structure 200.

With reference to FIGS. 1-4 and 6, the tack assembly 400 will now be described. Once an electronic device is clamped on the support member 200 using the clamp mechanism 300, the tack assembly 400 is used to tack the screen protector to the electronic device. In particular, the tack assembly 400 is intended to apply a perpendicular force onto the screen protector while the screen protector is positioned in proper alignment on the electronic device to prevent any shifting of the screen protector. Prior to tacking with the tack assembly 400, any non-perpendicular force applied onto the screen protector may cause movement of the screen protector on the electronic device due to the liquid that is present between the screen protector and the electronic device used during the wet installation process. Thus, the tacking action serves to prevent later movement of the screen protector relative to the electronic device when the final bonding steps are being performed with the roller assembly 500, as described below. During the tacking, it is important to ensure that there is a direct perpendicular force applied onto the screen protector because any forces applied at any angle to the perpendicular may cause the screen protector to shift and become misaligned. The tack assembly 400 described herein achieves this perpendicular application of force.

Figure 3:
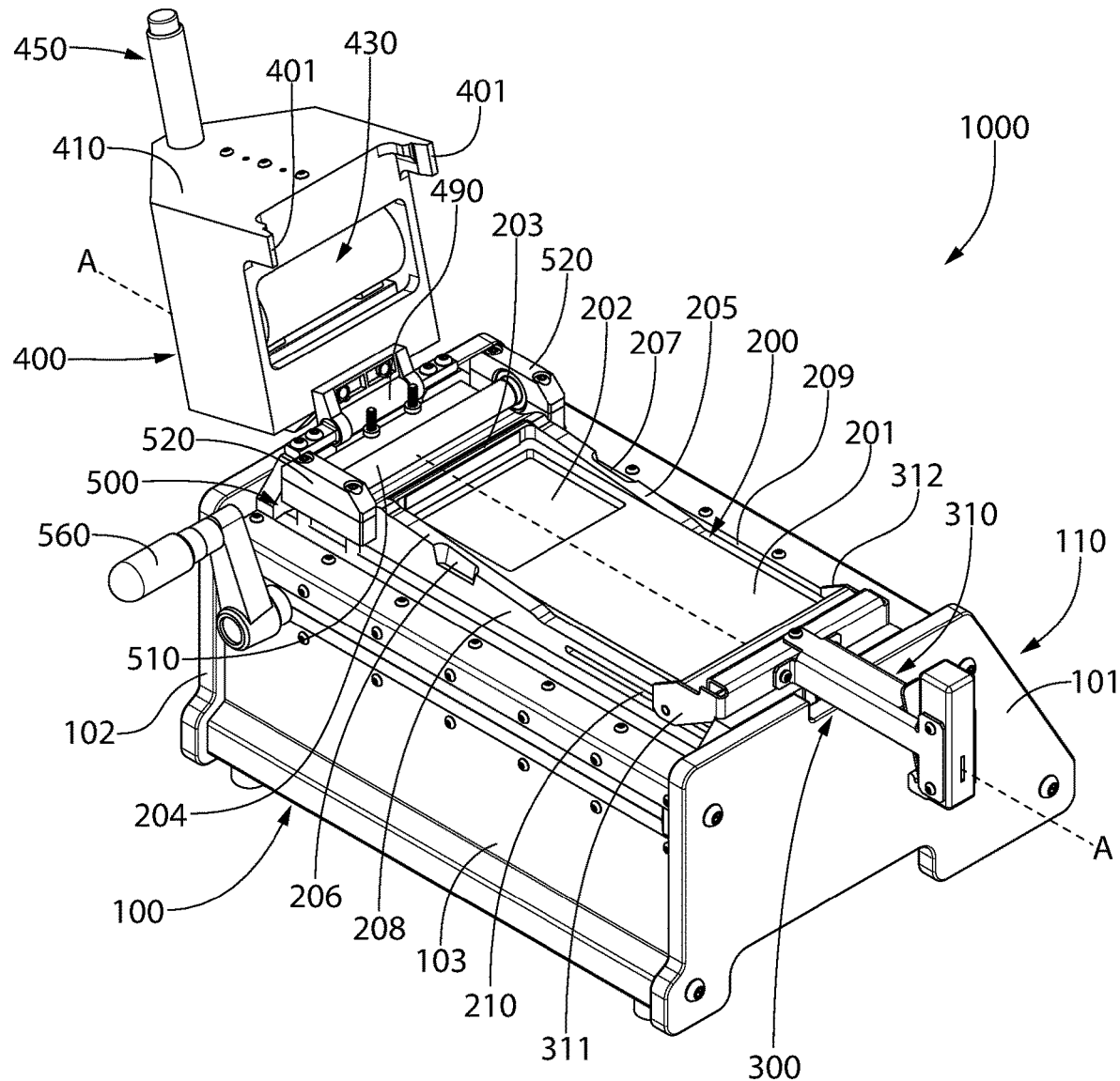
FIG. 3 is a front perspective view of the apparatus of FIG. 1 with a tack assembly thereof in a non-use position.
Figure 4:
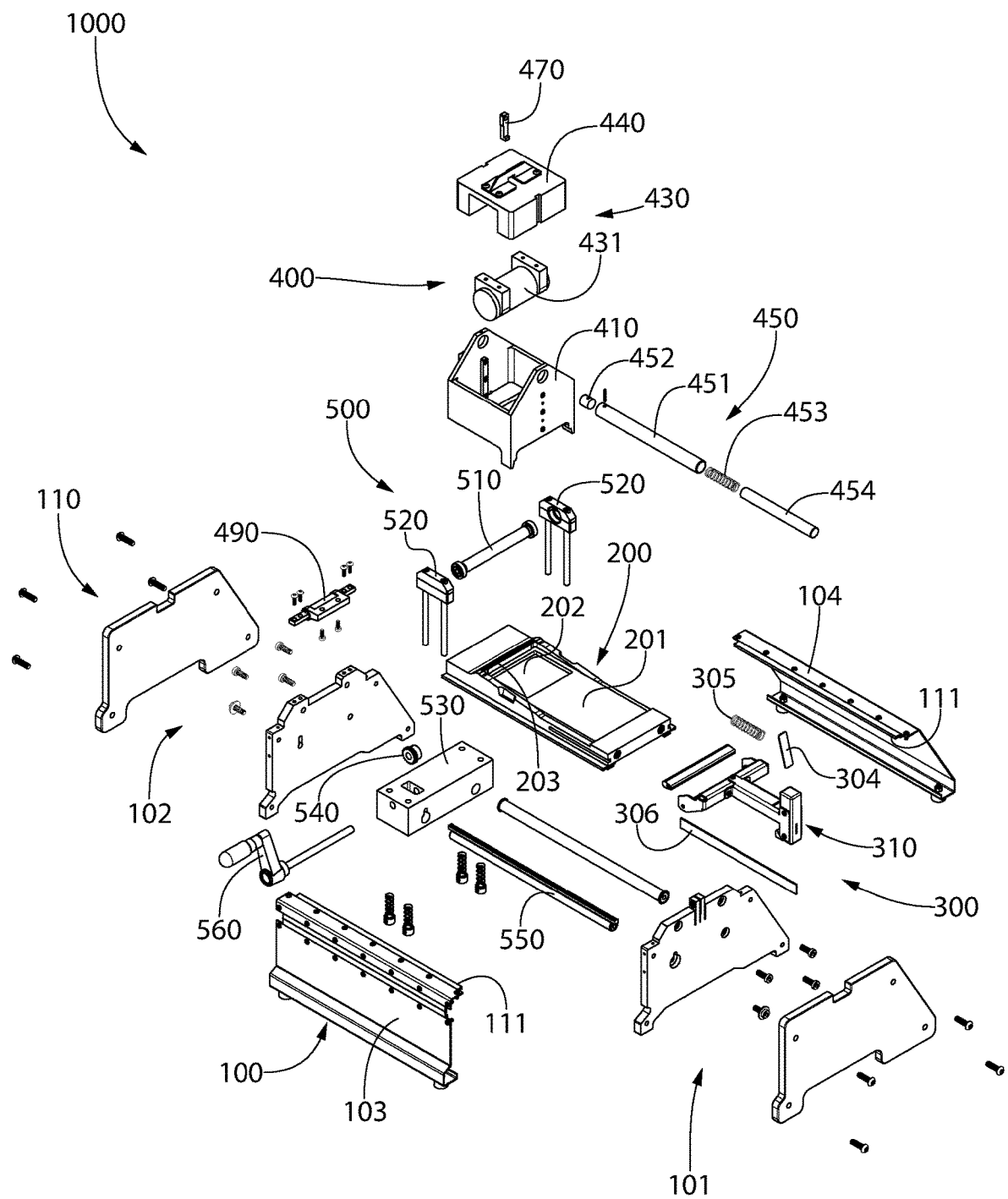
FIG. 4 is an exploded view of the apparatus of FIG. 1.
Figure 5:
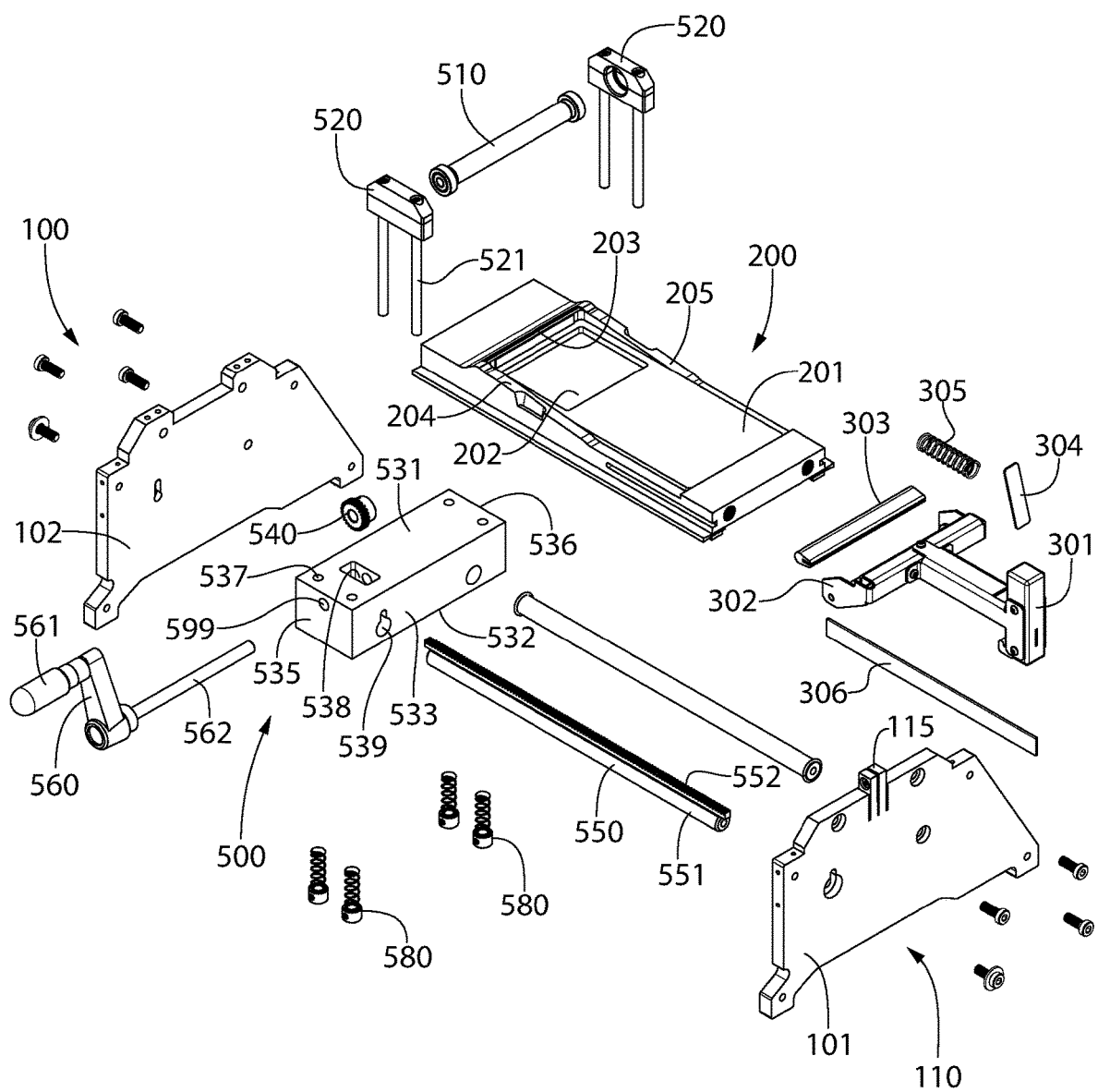
FIG. 5 is an exploded view illustrating a base member, a support member, a clamp mechanism, and a roller assembly of the apparatus of FIG. 1.

The tack assembly 400 generally comprises a housing 410, a tack member 430, and a release mechanism (or actuator) 450. In the exemplified embodiment, the tack assembly 400 is movable, and more specifically rotatably, coupled to the base assembly 100. In the exemplified embodiment, the tack assembly 400 rotatably coupled to the inner wall of the pair of rear walls 102 of the base unit 110, such that it is indirectly rather than directly coupled to the support member 200. However, in other embodiments the tack assembly 400 may be movably/rotatably coupled directly to the support member 200. In still other embodiments, the tack assembly 400 may be movable relative to the base assembly 100, without being physically coupled thereto. In the exemplified embodiment, the tack assembly 400 comprises a hinge 490 that couples the tack assembly 400 to the inner wall of the pair of rear walls 102 of the base unit 110 of the base assembly 100. In particular, the hinge 490 is coupled to the housing 410 of the tack assembly 400 and also to the inner wall of the pair of rear walls 102 of the base assembly 100 to enable the tack assembly 400 to rotate relative to the base assembly 100 and also relative to the support member 200. This enables the tack assembly 400 to be rotatable about a rotational axis from a non-use position as shown in FIG. 3 to a use position as shown in FIGS. 1 and 2. The user or operator can easily and readily rotate the tack assembly 40 via the hinge 490 between the non-use and use positions as needed during screen protector installation process. The release mechanism 450 has a portion that sticks out from the housing 410 and therefore forms a handle that a user can grip during movement of the tack assembly 400 between the use and non-use positions.

Although the invention is described whereby the tack assembly 400 is rotatable relative to the support member 200, the invention is not to be so limited in all embodiments. In other embodiments, the tack assembly 400 may simply be movable from non-use to use positions relative to the support member 200, while not being rotatable. Thus, the tack assembly 400 may be configured to move only vertically, vertically and then horizontally, in a sliding or translational manner, or in other ways relative to the support member 200. In still other embodiments, the tack assembly 400 may be detachable from the base assembly 100 and the support member 200 such that the tack assembly 400 can be placed onto the base assembly 100 and/or the support member 200 when needed for use and then removed from the base assembly 100 and/or the support member 200 when not needed.

The housing 410 of the tack assembly 400 comprises a cavity 411. Furthermore, the housing 410 of the tack assembly 400 has a bottom end 412. There is an opening 413 formed into the bottom end 412 of the housing 410 which provides a passageway into the cavity 411. In the exemplified embodiment, the housing 410 is also open along its top end, although this is not required in all embodiments. The housing 410 comprises a ledge feature 414 having an upper surface that faces the cavity 411 and a lower surface that forms the bottom end 412 of the housing 410. The opening 413 is located centrally along the ledge feature 414 such that the ledge feature 414 is divided into first and second ledges located on opposite sides of the opening 413. The housing 410 comprises an inner surface 415 that defines the cavity 411. Furthermore, there is one or more alignment feature 416 located on the inner surface 415. In the exemplified embodiment, the alignment features 416 are elongated protrusions that mate with corresponding features on the tack member 430, as described in greater detail below.

The housing 410 comprises openings 417 through which the release mechanism 450 extends. Thus, the release mechanism 450 extends through the housing 410 along an upper portion of the cavity 411. The tack member 430 is configured to be hung or suspended from the release mechanism 450, as described further below.

The tack member 430 is positioned within the cavity 411 of the housing 410. In the exemplified embodiment, the tack member 430 comprises a weight 431 and a guide member 440, although in other embodiments the tack member 430 may be a unitary structure rather than two separate components. The guide member 440 is a U shaped component with a channel 441 in its bottom surface within which the weight 431 is received. The weight 431 is preferably coupled to the guide member 440 within the channel 441 via fasteners. The guide member 440 comprises alignment channels 442 along two opposing side surfaces thereof. The alignment channels 442 are configured to mate with the alignment features 416 of the housing 410 when the tack member 430 is positioned within the cavity 411 of the housing 410. The alignment channels 442 and the alignment features 416 maintain the tack member 430 in proper alignment as it moves within the channel 411 of the housing 410, as described below.

The guide member 440 comprises an attachment feature 443 located on its top end. In the exemplified embodiment, the attachment feature 443 is a bracket that is coupled to the top end of the guide member 440 with fasteners such as screws. However, the attachment feature 443 could be integral with the guide member 440 in other embodiments. The attachment feature 443 comprises an aperture 444 that is configured to mate with a latch 470 of the release mechanism 450 for purposes of hanging or suspending the tack member 430 within the cavity 411 of the housing 410.

As noted above, the weight 431 is configured to be disposed within the channel 441 of the guide member 440 and attached to the guide member 440. The weight 431 comprises a cylindrical rubber rod 432 and attachment clamps 433 coupled to the cylindrical rubber rod 432. The attachment clamps 433 comprise openings configured to receive fasteners for purposes of coupling the weight 431 to the guide member 440. When the weight 431 nests within the channel 441 of the guide member 440, at least a portion of the weight 431 protrudes from the bottom end of the guide member 440. The tack member 430 may have a weight of approximately one kilogram in some embodiments, although a greater or lesser weight may be used in other embodiments. Moreover, while in the exemplified embodiment the weight 431 has a length that is substantially equal to the width of the upper support surface 201 of the support member 200, the invention is not to be so limited in all embodiments and the size and dimensions of the weight 431 may be modified from what is shown in the drawings.

As noted, the tack member 430 is held/suspended within the cavity 411 of the housing 410 by the latch 470 of the release mechanism 450. When the latch 470 releases its hold on the tack member 430, the tack member 430 falls downwardly within the cavity 411 of the housing 410. However, the tack member 430 is prevented from falling entirely through the bottom end 413 of the housing 410 due to the ledge 414. That is, the tack member 430 can only fall so far within the cavity 411 until the bottom end of the guide member 440 contacts the upper surface of the ledge 414. When in this position, a portion of the weight 431 protrudes through the opening 413 in the bottom end 412 of the housing 411. This enables the weight 431 to contact the screen protector located on an electronic device that is supported by the support member 200 during the installation process, as will be described in greater detail below. When the tack member 430 falls within the cavity 411 and makes contact with the screen protector located below it, the weight 431 tacks the screen protector in place on the electronic device to prevent the screen protector from sliding along the screen of the electronic device out of the desired alignment/placement. Thus, as used herein, the term "tack" means that the screen protector is bonded to the screen of the electronic device at the location of the contact between the tack member 430 and the screen of the electronic device. However, the tacking does not fully bond the screen protector to the electronic device, which is achieved in the final installation step using the roller assembly 500 as described further below.

Figure 6:
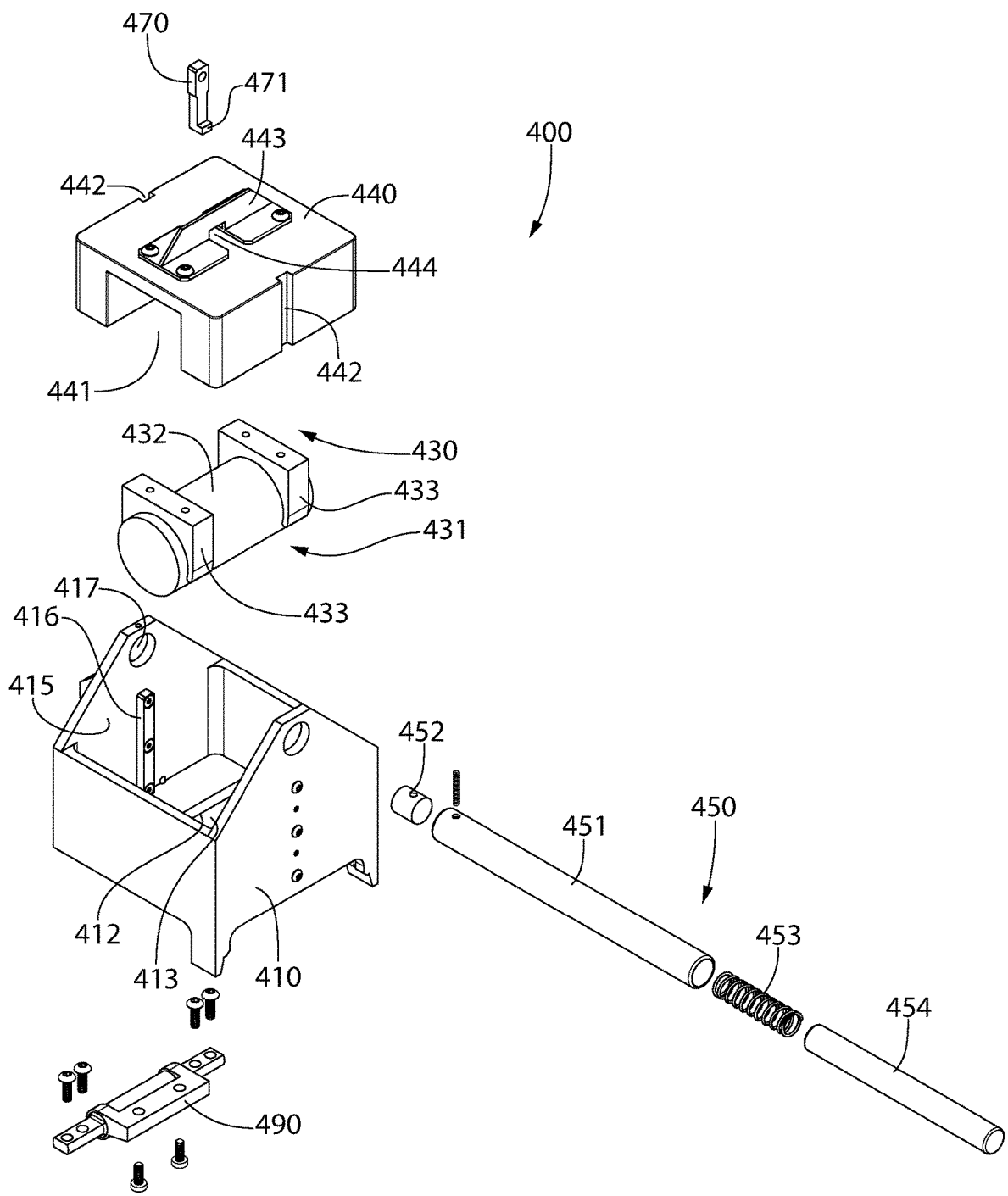
FIG. 6 is an exploded view of the tack assembly of FIG. 1.

Referring to FIGS. 6 and 7 concurrently, the release mechanism 450 of the tack assembly 400 will now be described. As noted above, the release mechanism 450 comprises the latch 470. Furthermore, the release mechanism 450 comprises an outer tube 451, an end cap 452, a spring 453, and an actuation element 454. The end cap 452 is positioned within the outer tube 451 to close one end thereof. The spring 453 is located within the outer tube 451 adjacent to the end cap 452. The actuation element 454 is located partially within the outer tube 451 such that a portion of the actuation element 454 protrudes from the end of the outer tube 451 opposite the end cap 452. In the exemplified embodiment, the actuation element 454 is an elongated rod-like member that has an outer diameter smaller than the inner diameter of the outer tube 451 so that the actuation element 454 can nest within the outer tube 451. The latch 470 is disposed within the outer tube 451 between the spring 453 and the actuation element 454. In the exemplified embodiment, the latch 470 is coupled to the end of the actuation element 454 that is positioned within the outer tube 451 by a fastener 459 such as a screw. A portion of the latch 470 which comprises a catch feature 471 protrudes from and is located external to the outer tube 451. The catch feature 471 stick out perpendicularly from the main body of the latch 470 and forms a ledge or shoulder. This allows the catch feature 471 of the latch 470 to engage the attachment feature 443 to suspend the tack member 430 within the cavity 411 of the housing 410 of the tack assembly 400.

Specifically, the catch feature 471 extends into the aperture 444 of the attachment feature 443 of the tack member 430 so that the attachment feature 443 rests atop of the ledge/shoulder formed by the catch feature 471.

Due to the positioning of the various components of the release mechanism 450, operation works as follows. If a user actuates the actuation element 454 by pressing the portion of the actuation element 454 which protrudes from the end of the outer tube 451 inwardly towards the outer tube 451, such force will cause the actuation element 454 to compress the spring 453 such that the spring 453 and the actuation element 454 move in the direction of the applied force. Similarly, because the latch 470 is sandwiched between the actuation element 454 and the spring 453 (and may be affixed to the distal end of the actuation element 454), the latch 470 will also move in the direction of the applied force. When the tack member 430 is hanging from the latch 470, such movement of the latch 470 will cause the latch 470 to become disengaged from the attachment feature 443 of the tack member 430. As such, the tack member 430 will no longer be suspended within the cavity 411 of the housing 410 by the latch 470 and the tack member 430 will fall (possibly free fall) within the cavity 411 until it makes contact with the screen protector on the electronic device positioned below it.

Referring once again to FIGS. 1-5 and 8, the roller assembly 500 will be described. The final step in the installation process is to cause the roller assembly 500 to roll over the screen protector to bond the entirety of the screen protector to the electronic device. If the roller assembly 500 were made to roll over the screen protector prior to tacking the screen protector with the tack assembly 400, the roller assembly 500 may cause the screen protector to slide relative to the electronic device, thereby placing it out of alignment. However, once the screen protector has been tacked to the electronic device, the roller assembly 500 may roll along and over the screen protector to bond the screen protector to the electronic device and remove any excess liquid that is present between the screen protector and the electronic device.

The roller assembly 500 comprises several components which operate together to generate a movement of a roller member 510 across the screen protector to bond it to the electronic device. In particular, the roller assembly 500 comprises the roller member 510, a pair of roller member supports 520 that support the roller member 510, a bearing carrier or carriage 530, a gear wheel 540, a linear gear 550, and an actuator 560. The gear wheel 540 and the linear gear 550 cooperatively engage one another and form a gear system that causes the bearing carrier 530, the roller member supports 520, and the roller member 510 to move along/across the support member 200 (and along any electronic device positioned thereon) when the actuator 560 is actuated. The linear gear 550, the wheel gear 540, and the bearing carrier 530 are located within the cavity 105 of the base assembly 100, and thus are hidden from view when the apparatus 100 is assembled.

The pair of roller member supports 520 are attached to the bearing carrier 530 and extend upwardly from the bearing carrier 530. Furthermore, the roller member 510 is supported by and extends between the pair of roller member supports 520. The roller member 510 may be configured to rotate about its longitudinal axis while supported between the pair of roller member supports 520. That is, the roller member 510 may be a freely rotating bar. Moreover, the roller member 510 may be formed from a resilient material, or may have a resilient/rubber exterior. In one embodiment, the roller member 510 may have an exterior formed from a resilient material having a 50A-60A Shore hardness durometer. Moreover, while two of the roller member supports 520 are illustrated in the exemplified embodiment, it may be possible for the roller member 510 to be supported by just one roller member support 520 in other embodiments. The roller member supports 520 comprise one or more legs 521 that extend from the bearing carrier 530 and support portions 522 coupled to the distal ends of the one or more legs 521. The roller member 510 is coupled to and extends between the support portions 522.

The bearing carrier 530 comprises a top surface 531, a bottom surface 532, a front surface 533, a rear surface 534, a first side surface 535, and a second side surface 536. The bearing carrier 530 further comprises apertures 537 in the top surface 531. The legs 521 of the roller member supports 520 extend into the apertures 537 in the top surface 531 of the bearing carrier 530 to couple the roller member supports 520 to the bearing carrier 530. Furthermore, the roller assembly 500 comprises a plurality of biasing members 580 that extend into openings in the bottom surface 532 of the bearing carrier 530. In the exemplified embodiment, the biasing members 580 are springs, although the invention is not to be so limited in all embodiments and the biasing members 580 could be hydraulic pistons, elastic resistance bands, electromechanical action, a combination of these mechanisms, or the like in various other embodiments.

The legs 521 of the roller member supports 520 are attached to the biasing members 580 so that the biasing members 580 bias (or pull) the roller member supports 520 (and the roller member 510 supported thereby) downwardly towards the upper support surface 201 of the support member 200 (and any electronic device positioned thereon). As the roller member 510 rolls over an electronic device, the roller member 510 may move upwardly and downwardly due to their attachment to the biasing members 580, depending on the thickness of the electronic device. This ensures that the roller member 510 exerts an even force against an electronic device positioned on the support member 200 during use. In one embodiment, the roller member 510 applies a constant force of between 10-20 Newtons, and more specifically between 12-15 Newtons, and more specifically approximately 13 Newtons against the electronic device positioned on the support member 200.

The gear wheel 540 is disposed within a cavity 538 that is formed into the top surface 531 of the bearing carrier 530. The gear wheel 540 is a wheel-shaped element with gear teeth thereon that facilitate a cooperative engagement between the gear wheel 540 and the linear gear 550. This allows the gear wheel 540 and the linear gear 550 to function as a rack and pinion type linear actuator.

Figure 8:
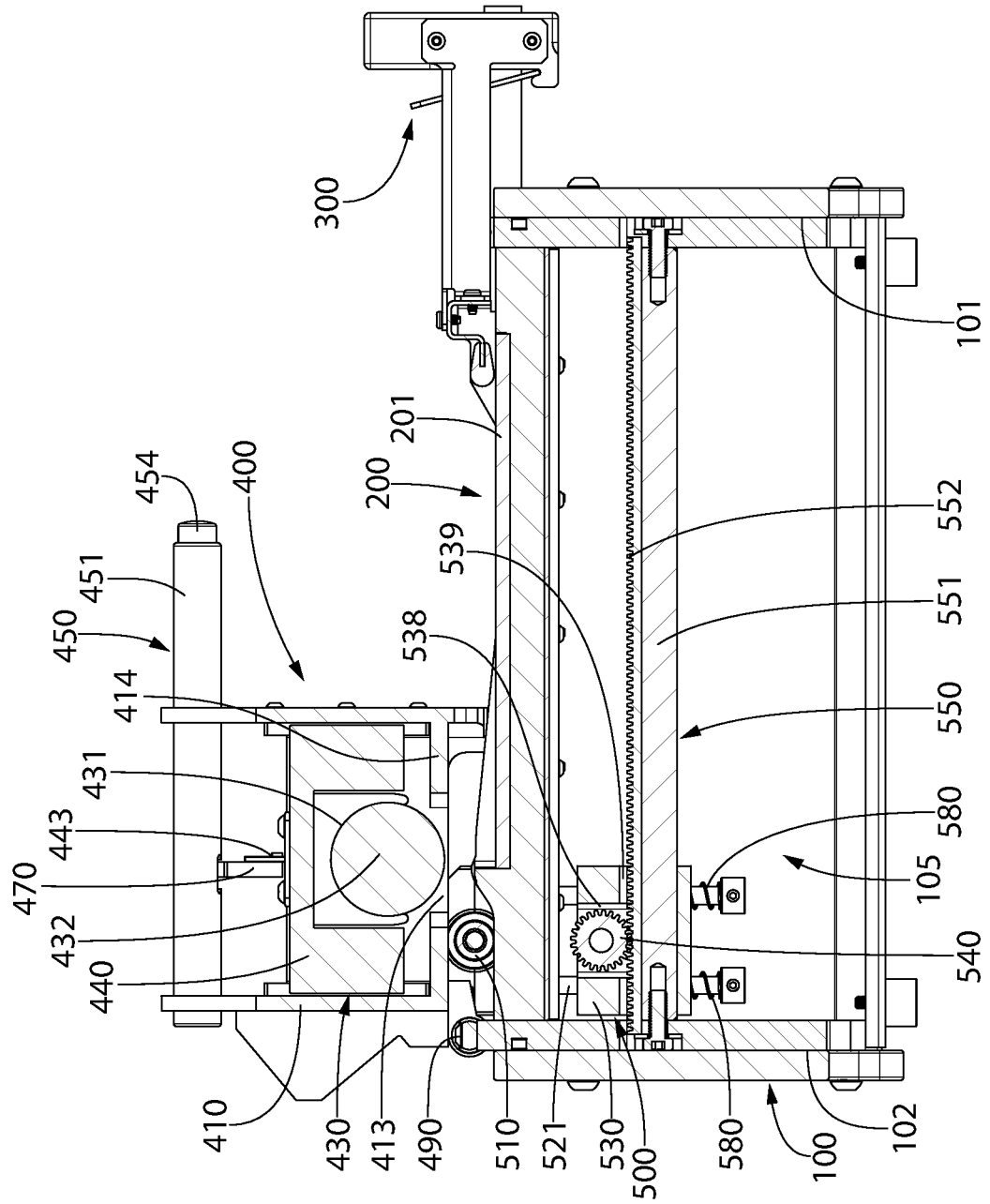
FIG. 8 is a cross-sectional view taken along line VIII-VIII of FIG. 2.

The linear gear 550 extends through a channel 539 that is formed through the bearing carrier 530. In particular, the channel 539 extends through the bearing carrier 530 from the front surface 533 thereof to the rear surface 534 thereof. The channel 539 is positioned below the cavity 538, and the cavity 538 is open at its bottom end such that the channel 539 and the cavity 538 are in spatial communication with each other. As a result, the gear wheel 540 rests atop of the linear gear 550 when the roller assembly 500 is fully assembled. The linear gear 550 comprises an elongated rod 551 and gear teeth 552 positioned along a top of the elongated rod 551. As best seen in FIG. 8, the linear gear 550 is secured to the inner walls of the front and rear pairs of walls 101, 102 of the base assembly 100. Thus, the linear gear 550 is fixed in place and the wheel gear 540 is permitted to roll along the linear gear 550 during operation of the apparatus 1000 as described herein. The engagement of the wheel gear 540 with the linear gear 550 and the positioning of the components is such that when the wheel gear 540 is made to rotate, the wheel gear 540, the bearing carrier 530, the roller member supports 520, and the roller member 510 all move axially along the linear gear 550 in the direction of the longitudinal axis A-A. That is, the linear gear 550 is elongated in a direction parallel to the longitudinal axis A-A of the support member 200 so the movement of all of the aforementioned components is in the direction parallel to the longitudinal axis A-A of the support member 200.

Finally, in the exemplified embodiment the actuator 560 is a crank handle that is actuated by rotation. The actuator 560 comprises a gripping portion 561 that is gripped by a user to actuate the same and a coupling post 562 that extends through an opening 599 in the first side surface 535 of the bearing carrier 530. The opening 599 in the first side surface 535 of the bearing carrier 530 is in spatial communication with the cavity 538 within which the wheel gear 540 is located. Thus, the coupling post 562 of the actuator 560 extends through the opening 599 so that a distal end of the coupling post 562 is coupled to the wheel gear 540. The coupling post 562 of the actuator 560 and the wheel gear 540 are coupled together so that rotation of the coupling post 562 results in the wheel gear 540 rotating (there is no relative rotation between the coupling post 562 and the wheel gear 540, but instead rotation of one results in rotation of the other).

During operation, a user rotates the actuator 560 about a rotational axis. The rotation of the actuator 560 causes the wheel gear 540 to also rotate about the rotational axis. Due to the engagement between the teeth of the wheel gear 540 and the gear teeth 552 of the linear gear 550, the rotation of the gear wheel 540 will cause the gear wheel 540 to move linearly along the linear gear 550. Furthermore, because the gear wheel 540 is located within and coupled to the bearing carrier 530, any linear movement of the gear wheel 540 will result in the same linear movement of the bearing carrier 530. Along those same lines, because the roller member supports 520 are coupled to the bearing carrier 530, as the bearing carrier 530 moves linearly, so too will the roller member supports 520 and the roller member 510 supported thereby. Thus, actuating (i.e., rotating) the actuator 560 will cause the roller member 510 to roll along the support member 200 (and any electronic device positioned thereon) in the direction of the longitudinal axis A-A. The actuator 560 may be rotated in one direction (clockwise, for example) to move the roller member 510 from the top end to the bottom end of the support member 200 and in the opposite direction (counterclockwise, for example) to move the roller member 510 from the bottom end to the top end of the support member 200.

Figure 9:
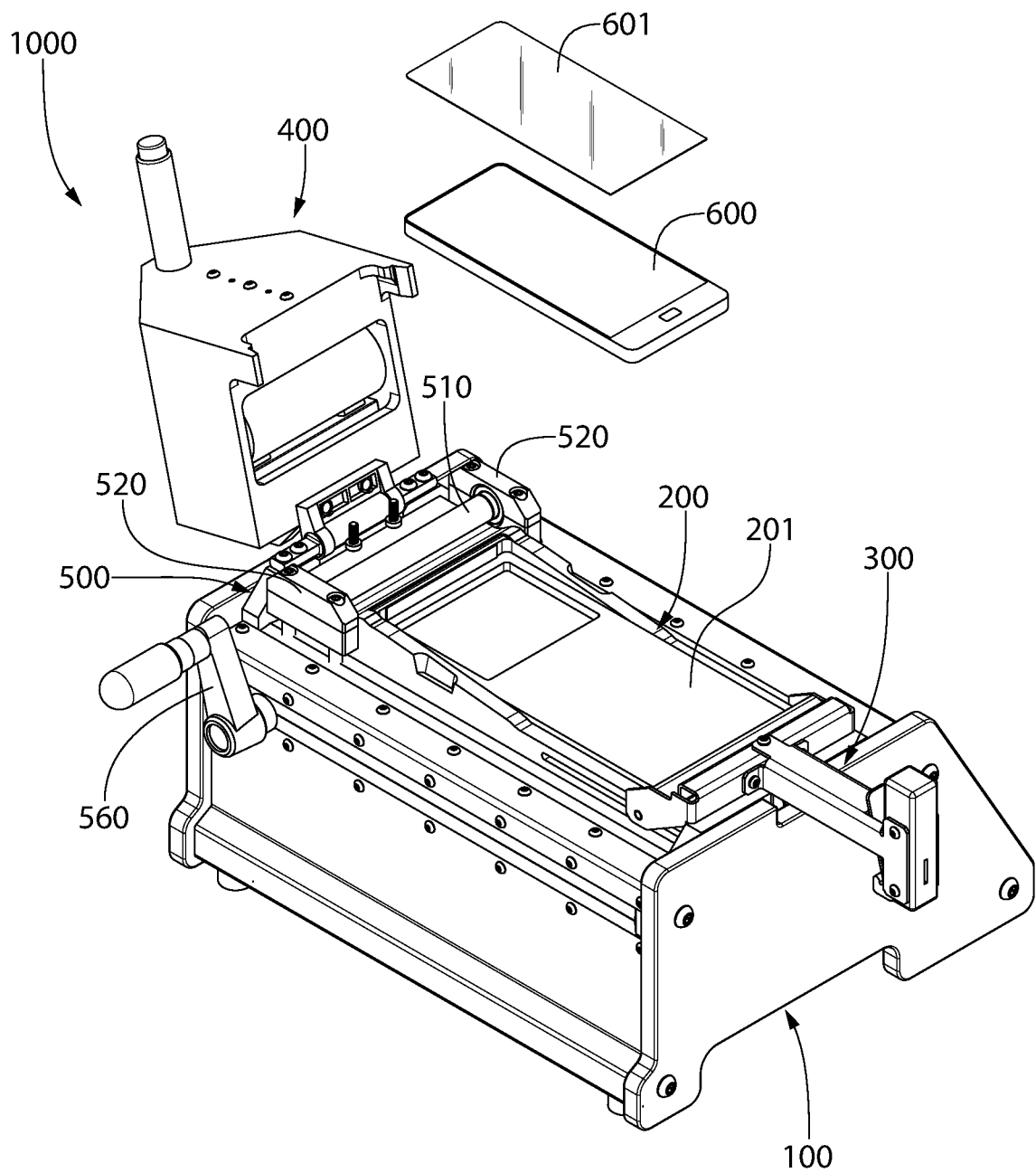
FIG. 9 is a front perspective view of the apparatus of FIG. 1 illustrating a screen protector being positioned onto an electronic device and illustrating the electronic device being positioned onto the support member of the apparatus.

Having completed a description of the various structures and components of the apparatus 1000, a description of the operation of the apparatus 1000 to install a screen protector onto an electronic device will be described. FIG. 9 illustrates the apparatus 1000 prepared to receive an electronic device 600 with a screen protector 610 thereon. The screen protector 601 may be formed from glass or plastics such as PET, PMMA, TPU, or the like. Of course, the invention is not to be limited by the material used for the screen protector 601 unless specifically claimed as such. The first step in the process is to wet the bottom surface of the screen protector 601 and/or the screen of the electronic device 600 and to place the screen protector 601 onto the screen of the electronic device 600. Because of the liquid between the screen protector 601 and the electronic device 600, after placement of the screen protector 601 onto the electronic device 600 the user can easily slide the screen protector 601 around to place it into proper alignment on the electronic device 600. Once the screen protector 601 is positioned on the electronic device 600 in proper alignment, the electronic device 600 is placed onto the upper support surface 201 of the support member 200 of the apparatus 1000 with the front face of the electronic device 600 and the screen protector 601 facing away from the upper support surface 201.

When the electronic device 600 is first placed onto the upper support surface 201 of the support member 200, the clamp mechanism 300 is in a fully retracted position to ensure there is sufficient space on the upper support surface 201 of the support member 200 for placement of the electronic device 600. Furthermore, the tack assembly 400 is in the non-use position such that it is rotated away from the support member 200. In the non-use position, the tack assembly 400 does not block or cover any of the upper support surface 201 of the support member 200, leaving it open for placement of the electronic device 600 thereon. When the tack assembly 400 is rotated (or otherwise moved as discussed above) into the use position, the tack assembly 400 covers a part of the upper support surface 201 of the support member 200. This is necessary because the tack assembly 400 is intended to directly contact the electronic device 600 positioned on the support member 200 to "tack" the screen protector 601 to the electronic device 600, as described in greater detail below.

Figure 10:
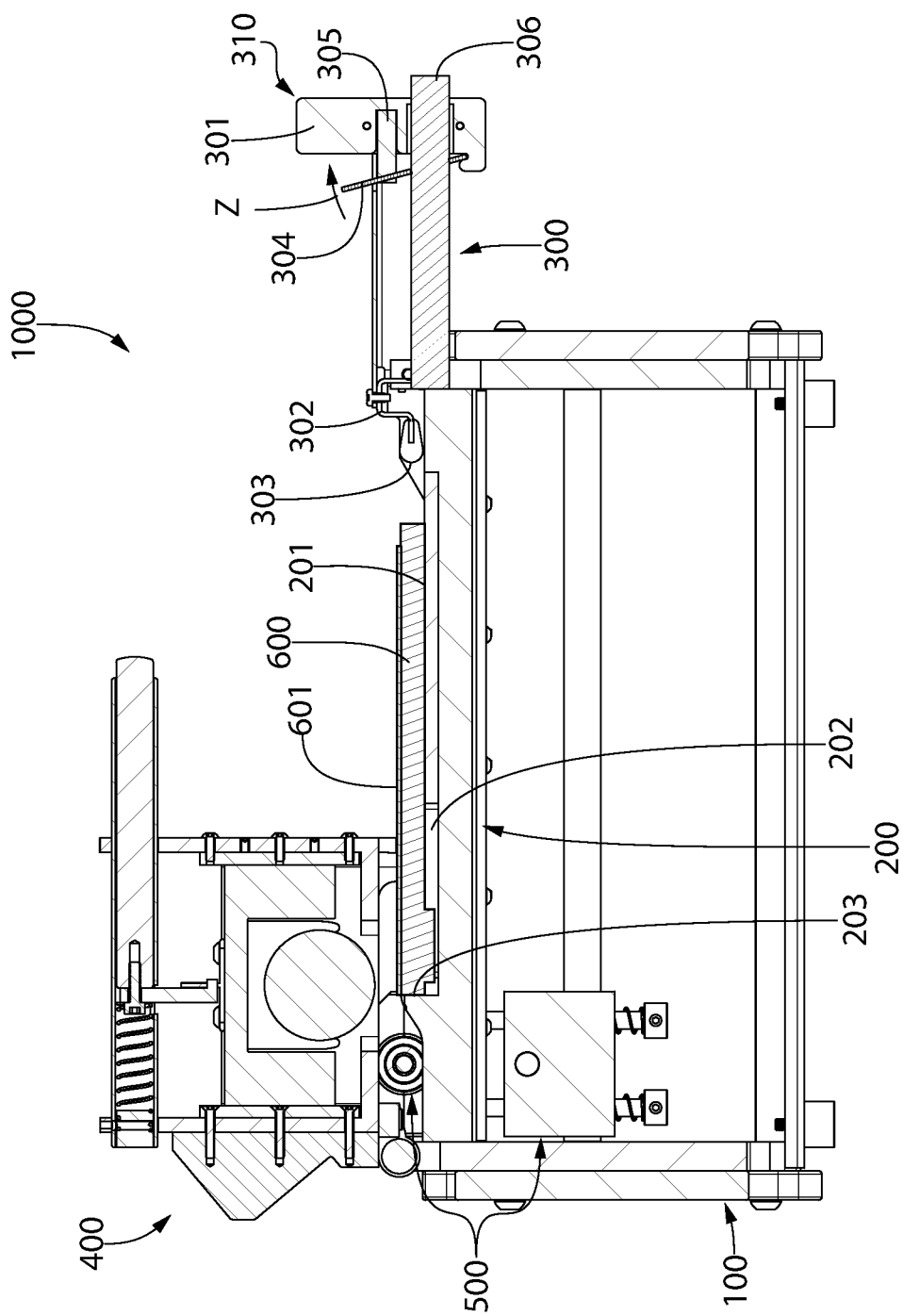
FIG. 10 is the cross-sectional view of FIG. 7 with the electronic device of FIG. 9 positioned on the support member of the apparatus.

Referring to FIG. 10, after the electronic device 600 with the screen protector 601 positioned thereon is placed onto the upper support surface 201 of the support member 200, the tack assembly 400 may be moved or rotated from the non-use position to the use position. However, while this is shown as having been done already in FIG. 10, this is not required to be done at this step in the process. Rather, in other embodiments the tack assembly 400 may be left in its non-use position until the clamp mechanism 300 is moved into position to clamp the electronic device 600 in place. However, the tack assembly 400 does not interfere with the operation of the clamp mechanism 300 so it is up to the user/operator to decide whether to alter/move the tack assembly 400 into the use position before or after clamping the electronic device 600 into position with the clamp mechanism 300.

Referring to FIGS. 10 and 11 concurrently, operation of the clamp mechanism 300 to clamp the electronic device 600 will be described. FIG. 10 illustrates the clamp mechanism 300 in the fully retracted position, and in such position the distal end 303 of the clamp structure 310 is spaced apart from and not in contact with the bottom end of the electronic device 600. Thus, as shown in FIG. 11, the user can actuate the trigger 304 of the clamp mechanism 300 by pressing the trigger 304 inwardly in the direction of the arrow Z shown in FIG. 10. Actuating the trigger 304 in this manner releases the frictional engagement between the trigger 304 and the elongated bar 306 and allows the clamping structure 310 of the clamp mechanism 300 to slide in the direction of the longitudinal axis A-A relative to the support member 200.

As seen in FIG. 11, the clamping structure 310 of the clamp mechanism 300 has been slid to the left until the distal end 303 of the clamp mechanism 300 contacts the bottom edge of the electronic device 600. When the clamp structure 310 is moved into this position, the electronic device 600 is sandwiched between the distal end 303 of the clamp mechanism 300 and the stopper 203. As discussed above, the location of the clamp structure 310 may be modified and adjusted to accommodate electronic devices of different lengths on the support structure 200. When the clamp structure 310 is in position as shown in FIG. 11, the electronic device is prevented from moving axially by the clamp structure 310, transversely due to the grippiness of the upper support surface 201 of the support structure 201, and in depth due to being leveled due to the recess 202 in the upper support surface 201 of the support structure 201.

Once the clamping structure 310 is into the position shown in FIG. 11 whereby the electronic device 600 is axially restrained in movement by the clamping structure 310, the tack assembly 400 may be moved into its use position if it is not already there. If the tack assembly 400 were in the non-use position, a user could grip the release mechanism 450 and rotate the tack assembly 400 about a rotational axis R-R until the legs 401 of the tack assembly 400 nest within the notches 206, 207 of the support member 200. As noted, above, this has already been done in FIGS. 10 and 11, and as such the tack assembly 400 is already in the use position. Moreover, as noted above the rotatable coupling between the tack assembly 400 and the base assembly 100 is not required in all embodiments and the tack assembly 400 may be moved into its use position in other ways.

Figure 12:
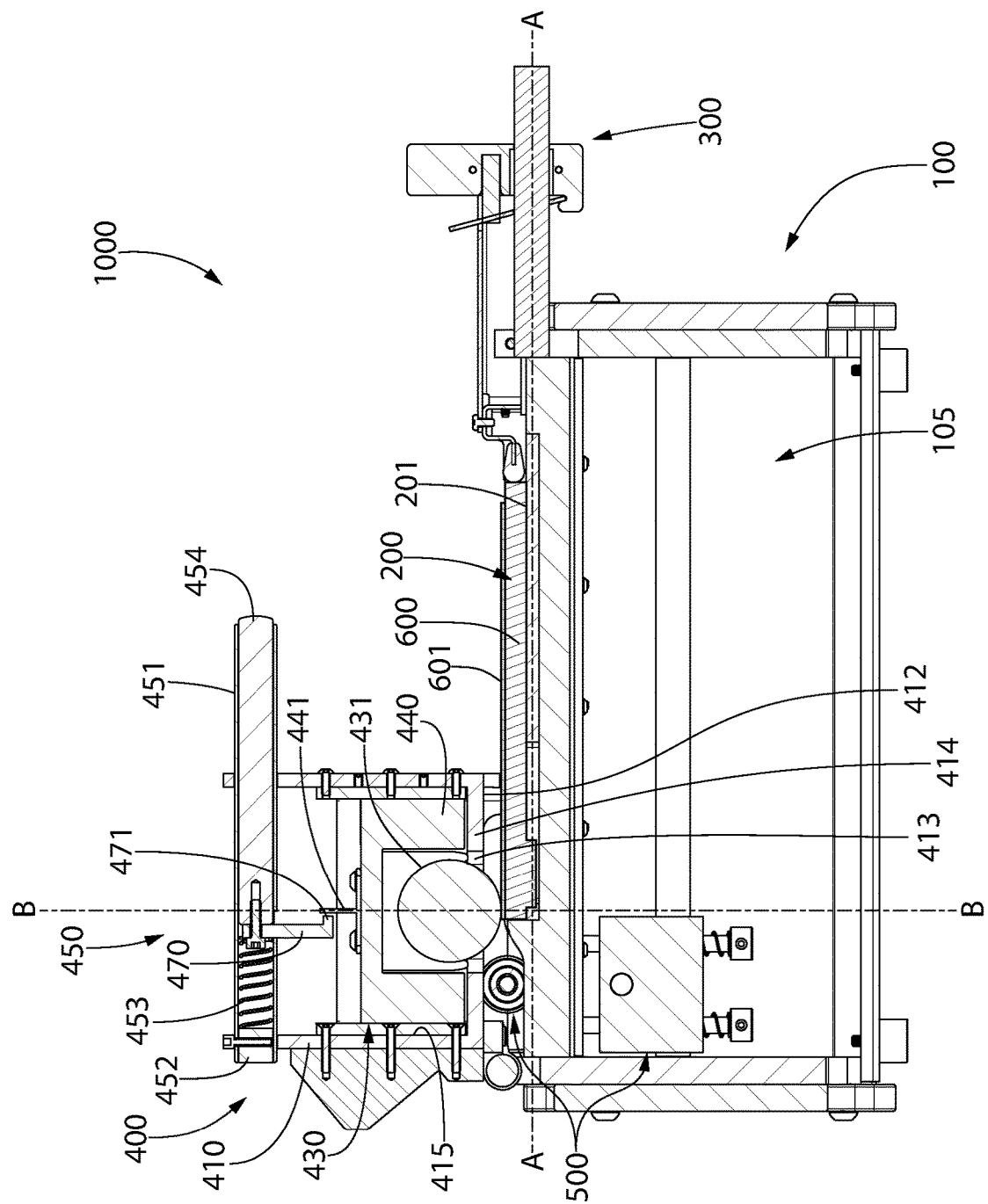
FIG. 12 is the cross-sectional view of FIG. 11 with a release mechanism of the tack assembly being actuated to release a tack member thereof in order to tack the screen protector to the electronic device.

Referring now to FIGS. 11 and 12, once the clamp mechanism 300 is in position and the tack assembly 400 is in the use position, it is time to apply a perpendicular force onto the screen protector 601 to tack the screen protector 601 to the electronic device 600. In the exemplified embodiment, this is achieved by allowing the tack member to fall vertically downwardly along an axis that is perpendicular to the outer surface of the screen protector 601. However, the invention is not to be so limited in all embodiments and other mechanisms and/or processes can be used to achieve the tacking. For example, springs, electromechanical devices, solenoids, hydraulics, pistons, gas-filled struts, or other force applying techniques may be used. In some embodiments, instead of dropping a weight onto the screen protector 601, a tack member (which is a component having any shape, size, or form) may be hydraulically or mechanically moved downwardly into contact with the screen protector to apply a downward force onto the screen protector. Thus, the important feature is that a perpendicular force is applied onto the screen protector to tack the screen protector to the electronic device prior to rolling, and this can be achieved in various different ways and should not be limited only to the exemplified embodiment.

With reference to the exemplified embodiment, the tacking is achieved by a user pressing the actuation element 454 inwardly in the direction of the arrow X shown in FIG. 11. As seen in FIG. 12, when the actuation element 454 is pressed inwardly, the latch 470 of the release mechanism 450 becomes disengaged from the attachment feature 443 of the tack member 430. This is because pressing the actuation element 454 in the direction of the arrow X causes the latch 470 to move the same distance in the direction of the arrow X as the actuation element 454, which causes the catch 471 of the latch 470 to become removed from the aperture 444 in the attachment feature 443 of the tack member 430. Upon the latch 470 being disengaged from the attachment feature 443 of the tack member 430, the tack member 430 is no longer supported by any feature within the cavity 411 of the housing 410. Thus, pressing the actuation element 454 results in the tack member 430 falling downwardly within the cavity 411 of the housing 410 until a portion of the tack member 430 protrudes through the opening 413 in the bottom end 412 of the housing 410 and contacts the screen protector 601 on the electronic device 600.

As can be seen, when the actuation element 454 is actuated, the tack member 430 falls downwardly along a vertical axis B-B that is perpendicular to the longitudinal axis A-A of the upper support surface 201 and perpendicular to the screen protector 601. The vertical axis B-B is also perpendicular to the longitudinal axis of the electronic device 600, which is the axis extending along the length of the electronic device 600. Thus, the tack member 430 applies a perpendicular force onto the screen protector 601 upon contact therewith. In some embodiments, it may be important for the tack member 430 to fall onto the screen protector 601 at a direct perpendicular angle as shown in order to prevent the screen protector 601 from sliding or shifting along the screen of the electronic device 600 when the tack member 430 contacts the screen protector 601. As the tack member 430 (which includes the weight 431 and may weigh one kilogram in some embodiments) contacts the screen protector 601, the screen protector 601 bonds (i.e., is tacked) to the screen of the electronic device 600 at the point/location of the contact. In the exemplified embodiment, the tack member 430 contacts the screen protector 601 at a position adjacent to the top end or edge of the electronic device 600. However, the invention is not to be so limited in all embodiments and the location at which the tack member 430 contacts the screen protector 601 could be modified in other embodiments. For example, the tack assembly 400 could be positioned so that the tack member 430 contacts the screen protector 601 along a mid-portion of the electronic device 600 or along a bottom portion of the electronic device, while still achieving a bonding between the screen protector 600 and the electronic device 601 at the location of the contact.

In the exemplified embodiment, the release of the tack member 430 results in the tack member 430 falling downwardly generally by gravity. However, the outer surface of the tack member 430 may contact the inner surface 415 of the housing 410 which could result in some friction therebetween such that the tack member 430 may not free fall because the free fall may be slightly impeded by the frictional contact between the housing 410 and the tack member 430. In any case the tack member 430 falls with sufficient force to generate a bond between the screen protector 601 and the electronic device 600. In the exemplified embodiment, the tack member 430 may fall between 1 mm and 20 mm, or more specifically between 1 mm and 10 mm, when it is released from the release mechanism 450. This allows the bonding between the screen protector 601 and the electronic device 600 without damaging the screen protector 601.

Figure 13:
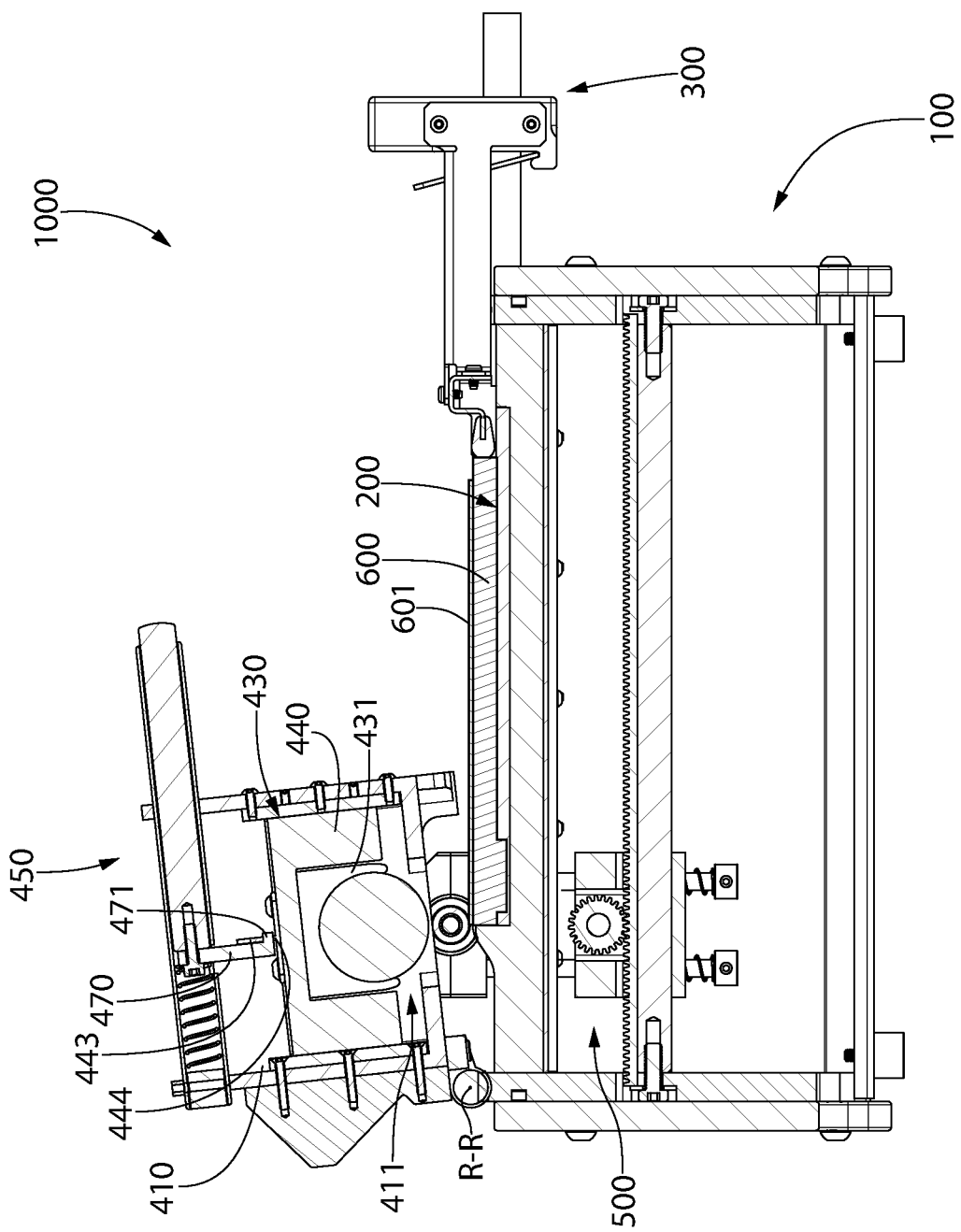
FIG. 13 is the cross-sectional view of FIG. 12 illustrating the tack assembly being rotated away from the support member back to a non-use position.

Referring to FIGS. 12 and 13, once the tack member 430 has been dropped onto the screen protector 601, the tack assembly 400 can be moved from its use position back to its non-use position. In the exemplified embodiment, this is accomplished by a user gripping the portion of the release mechanism 450 which protrudes from the housing 410 and rotating the tack assembly 400 about the rotational axis R-R. The action of rotating the tack assembly 400 from the use position back to the non-use position causes the latch 470 to reengage the attachment feature 443 of the tack member 430. In particular, as the housing 410 is rotating, the tack member 430 moves upwardly within the cavity 411 of the housing 410 and the attachment feature 443 slides onto the latch 470. Thus, the tack assembly 400 is automatically re-prepared for use once such use is again desired, without a user having to perform any additional action to reset the tack member 430 on the latch 470. Of course, as noted herein the tack assembly 400 can be moved from the use position to the non-use position in other ways, which have been described herein above.

Figure 14:
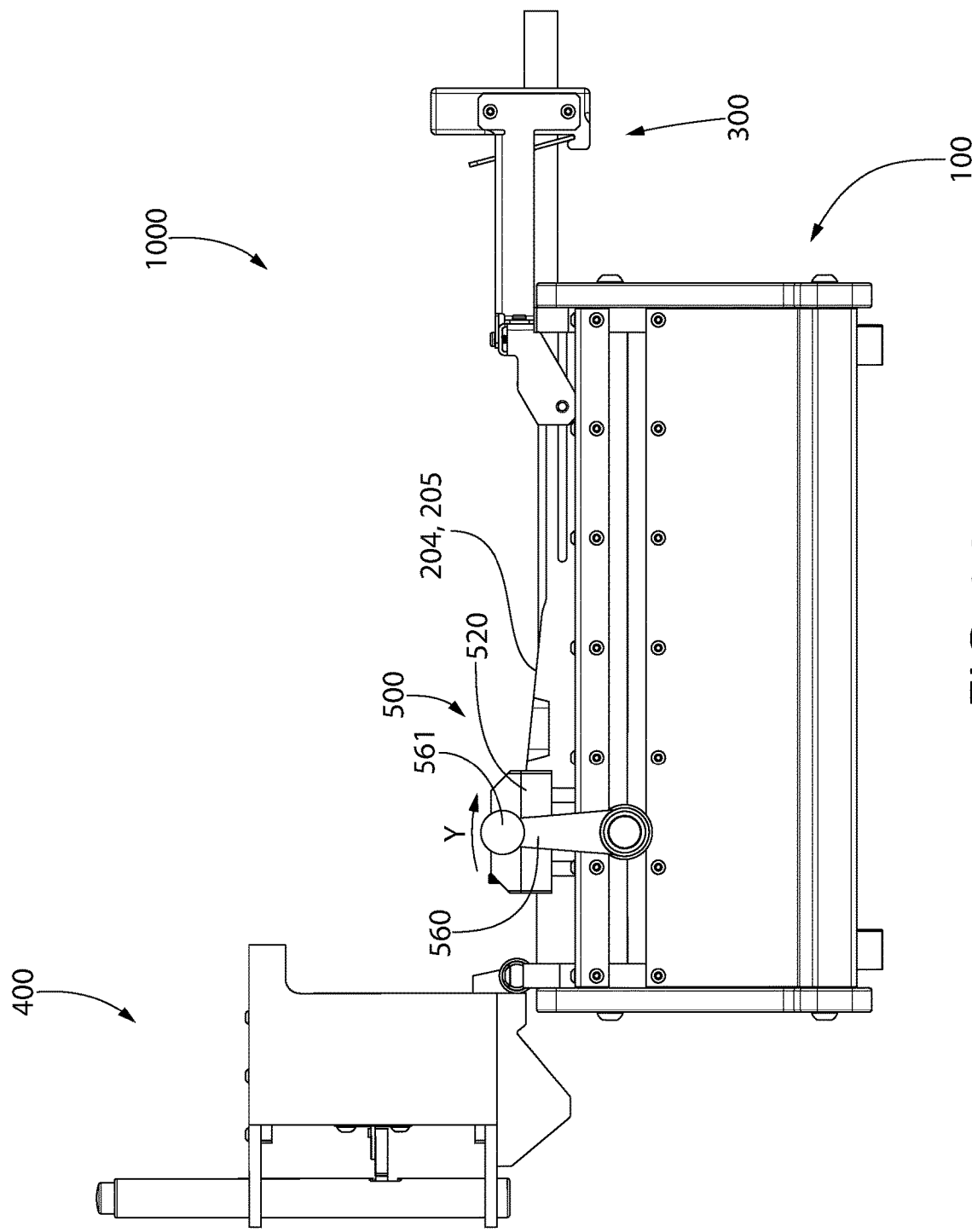
FIG. 14 is a side view of the apparatus of FIG. 1 illustrating an actuator of the roller assembly being actuated.

Referring to FIG. 14, the tack assembly 400 has been returned to its non-use position such that it is no longer aligned with any part of the upper support surface 201 of the support member 200 or the electronic device 600 positioned thereon. This is required in the exemplified embodiment because the roller member 510 cannot be moved along the screen protector 601 while the tack assembly 400 is in the use position, because the tack assembly 400 blocks such movement of the roller member 510. Thus, in order to perform the final bonding step of moving the roller member 510 along the screen protector 601, the tack assembly 400 must first be moved to the non-use position. Of course, other embodiments are possible whereby the tack assembly 400 is positioned so as not to block movement of the roller member 510 even when in its use position. Furthermore, FIG. 14 has an arrow Y illustrating that the actuator 560 should be rotated in order to cause the roller member 510 to move along the screen protector 601 to bond the screen protector 601 to the electronic device 600.

Figure 15:
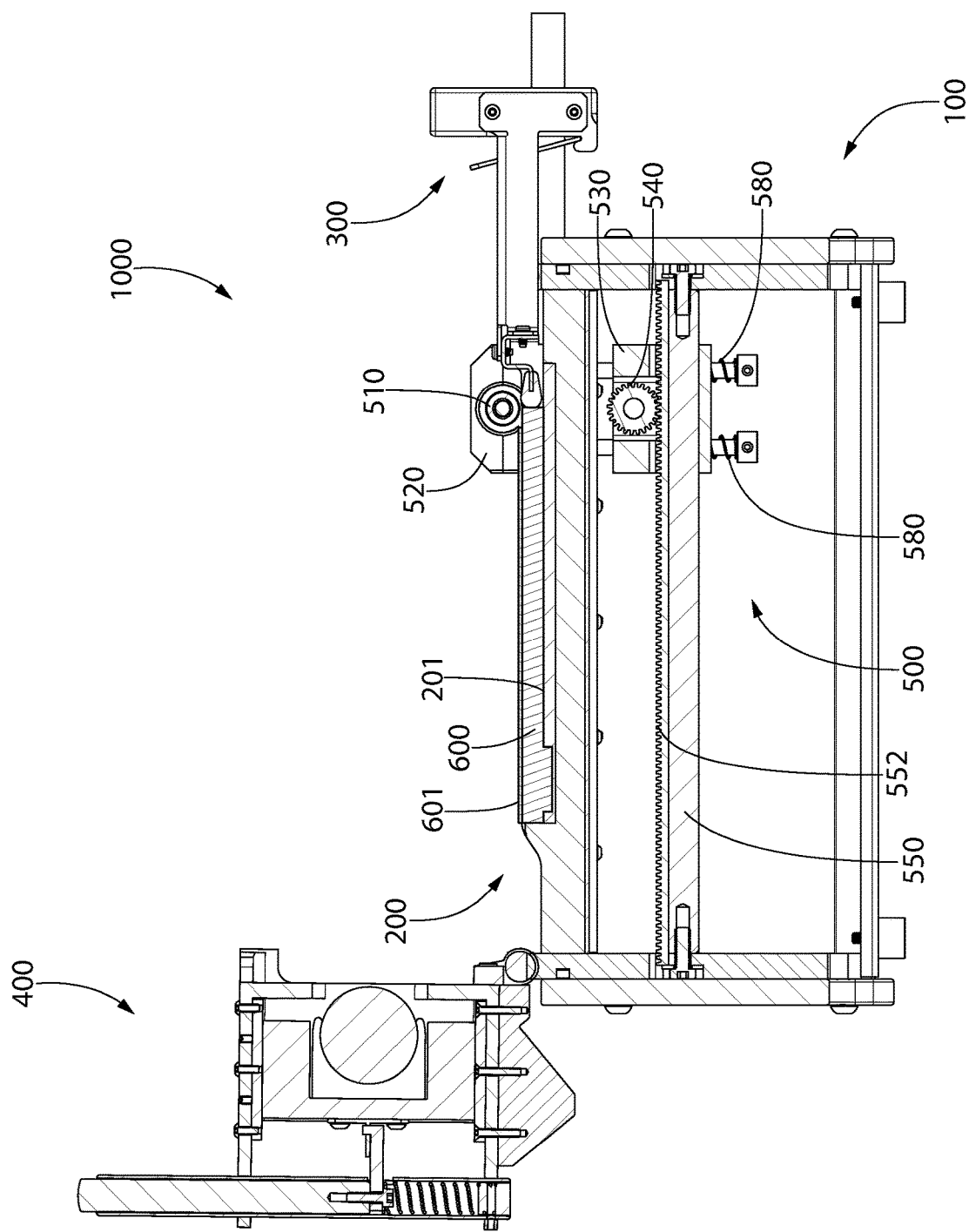
FIG. 15 is a cross-sectional view of the apparatus of FIG. 1 with the tack assembly in the non-use position and illustrating a roller member of the roller assembly moving across the screen protector to bond the screen protector to the electronic device.

Thus, referring to FIGS. 14 and 15 concurrently, the result of a user or operator rotating or otherwise actuating the actuator 560 of the roller assembly 500 is illustrated. In particular, as the user rotates the actuator 560 in the clockwise direction, the gear wheel 540 also rotates in the clockwise direction. The rotation of the gear wheel 540 causes the gear wheel 540 to move axially along the linear gear 550 due to the engagement of the teeth of the gear wheel 540 with the gear teeth 552 of the linear gear 550. Moreover, because the gear wheel 540 is located within the bearing carrier 530, the bearing carrier 530 also moves axially along the linear gear 550. As noted, the roller member supports 520 are attached to the bearing carrier 530 so as the bearing carrier 530 moves axially along the linear gear 550, the roller member supports 520 also move linearly in the direction of the longitudinal axis A-A. And finally, because the roller member 510 is supported by the roller member supports 510, the roller member 510 moves axially along the screen protector 601 in the direction of the longitudinal axis A-A. Thus, as shown in FIG. 15, as the user actuates the actuator 560 the roller member 510 rolls over and along the screen protector 601 to bond the screen protector 601 to the electronic device 600.

Furthermore, as noted above the roller assembly 500 also comprises the biasing members 580 which function to pull the roller member 510 downwardly towards the screen protector 601 as the roller member 510 moves along the screen protector 601. Thus, the biasing members 580 may be tension springs (or extension springs) in some embodiments. As the tension springs are pulled due to the roller member 510 rolling along the screen protector 601, the tension springs resist the pulling force and pull the roller member 510 back downwardly towards and into forcible contact with the screen protector 601. The biasing members 580 may ensure that the roller member 510 applies a constant force of between 10-20 Newtons, and more specifically between 12-15 Newtons, and more specifically approximately 13 Newtons against the screen protector 601 as the roller member 510 rolls/moves along the screen protector 601. The roller member 510 may rotate about its own longitudinal axis as it moves across the screen protector 601 in some embodiments, although this is not required in all embodiments.

While the roller member 510 is illustrated as a cylindrical, rod-shaped member in the exemplified embodiment, the invention is not to be so limited in all embodiments. In other embodiments, the roller member may be more of a flat shaped member which may operate as a squeegee that applies a force onto the screen protector 601 as it moves along the screen protector 601. In either case, as the roller member 510 moves along or across the screen protector 601, the roller member 510 squeezes any liquid that exists between the screen protector 601 and the electronic device 600 out to allow the screen protector 601 to bond to the screen of the electronic device 600. The biasing members 580 automatically adjust the height of the roller member 510 to ensure constant contact with the screen protector 601 while the roller member 510 moves smoothly along the outer surface of the screen protector 601.

Figure 16:
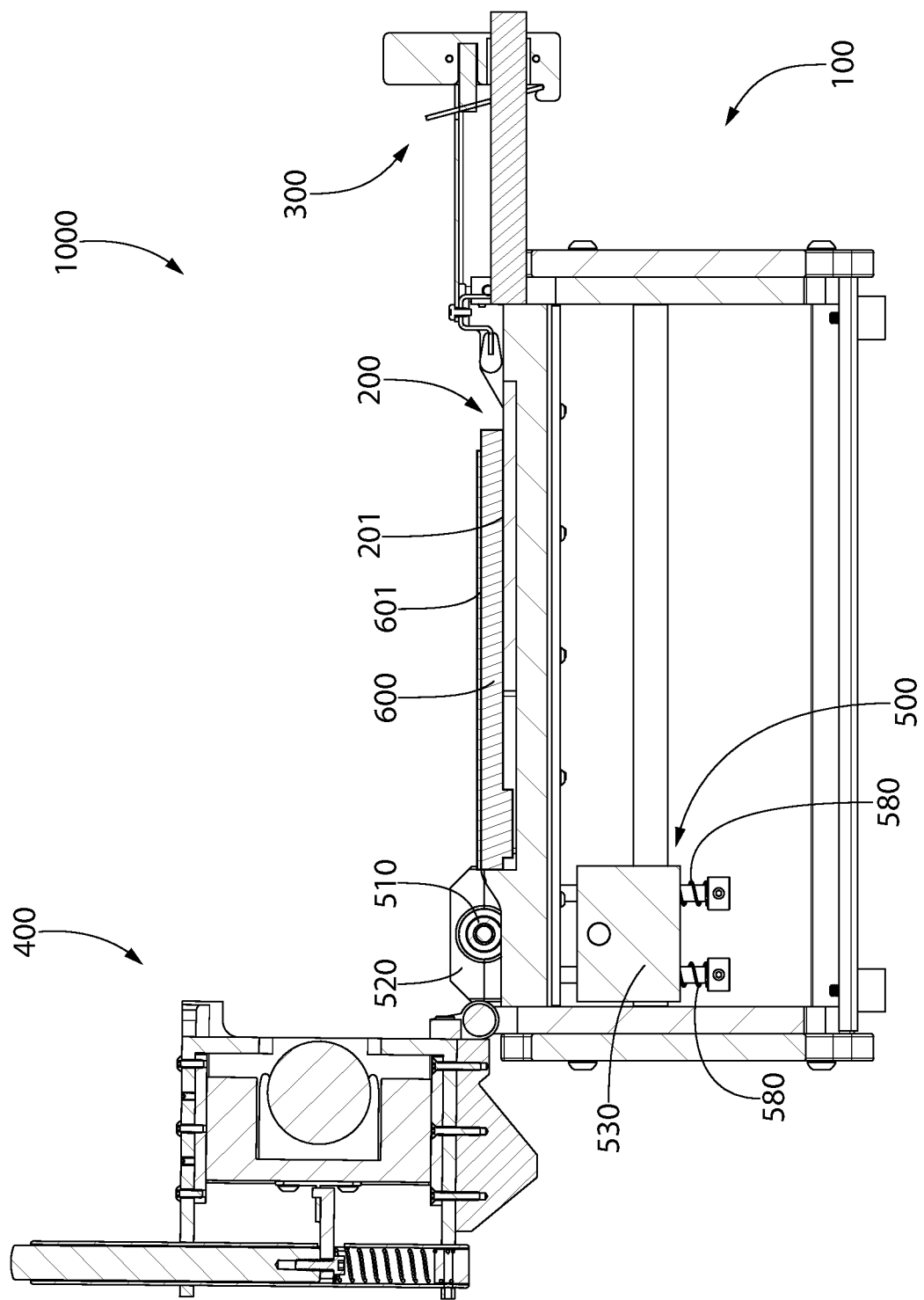
FIG. 16 is the cross-sectional view of FIG. 16 illustrating the roller member having returned to its initial position adjacent a top end of the electronic device.

After the roller member 510 reaches the far end of the screen protector 601 as shown in FIG. 15, the user can begin to rotate the actuator 560 in the counterclockwise direction. This will cause the wheel gear 540, the bearing carrier 530, and the roller member 510 to move in the opposite axial direction along the screen protector 601. This is illustrated in FIG. 16, whereby the roller member 510 has returned to its original position along the support member 200. The user can continue actuating the actuator 560 by rotating it clockwise and counterclockwise to allow the roller member 510 to continue making additional passes over the screen protector 601 until the screen protector 601 is completely bonded to the electronic device 600. It should be noted that the roller member 510 may roll along the first and second ramped walls 204, 205 for at least some distance, dependent upon the thickness of the electronic device 600. The first and second ramped walls 204, 205 allow the apparatus 1000 to be universal, as phone thicknesses vary widely. Thus, the first and second ramped walls 204, 205 allow the roller member 510 to gently contact the screen protector 610 at the top end of the electronic device, via a sloped profile, and allows for a wide variety of electronic device thicknesses to be compatible with installation. In particular, rather than the roller member 510 dropping off an edge and falling/being pulled downwardly onto the screen protector 601, the roller member 510 rolls gently and seamlessly onto the screen protector 601 as it rolls along the ramped walls 204, 205 prior to engagement with the screen protector 601.

Figure 17:
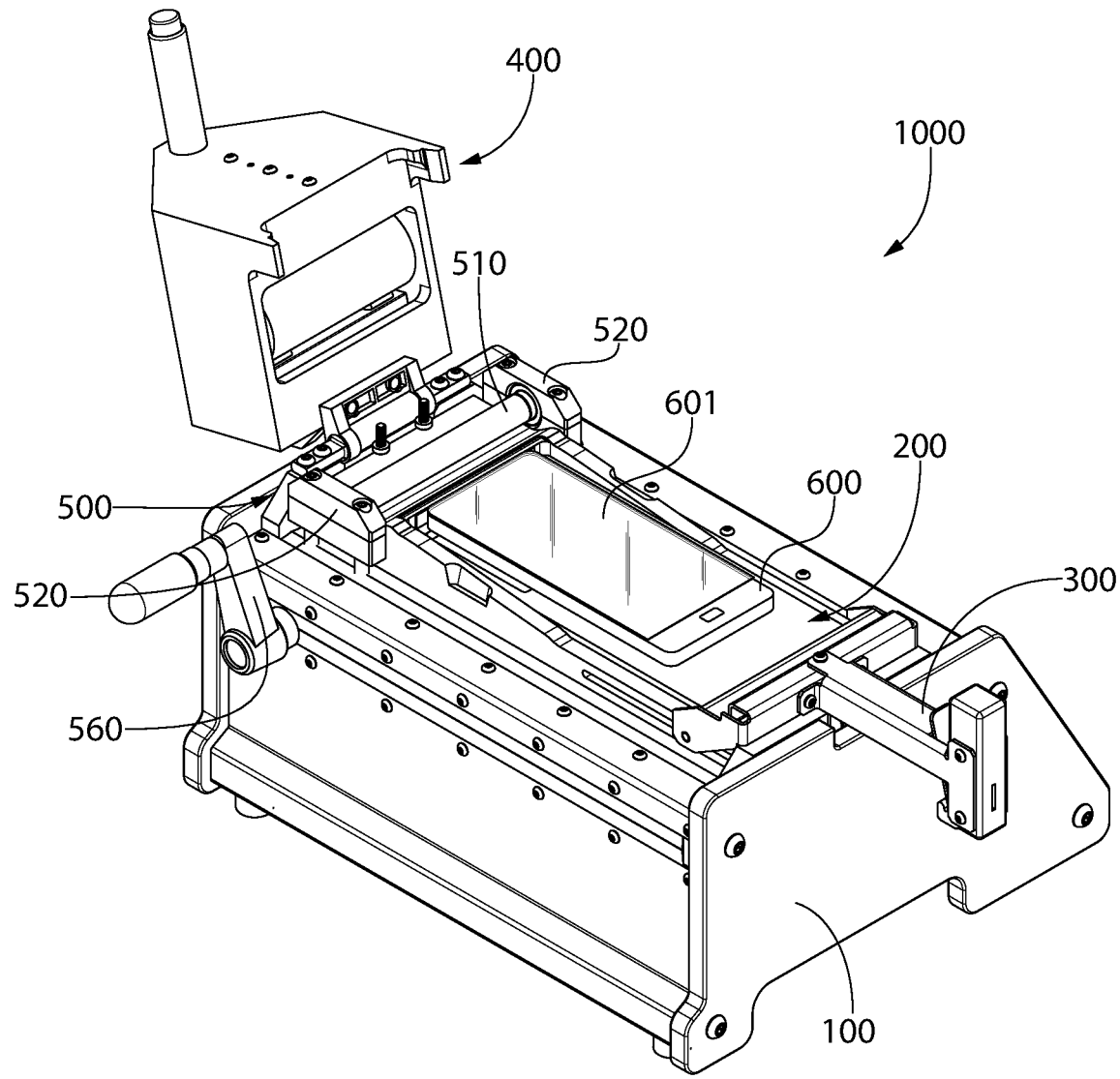
FIG. 17 is a perspective view of the apparatus of FIG. 1 with the electronic device with the screen protector having been bonded thereto located on the support member of the apparatus.

Finally, referring to FIG. 17, once a sufficient number of passes between the roller member 510 and the screen protector 601 have been completed, the electronic device 600 is ready to be removed from the apparatus 1000. Thus, the roller member 510 is placed into its original position adjacent to the top end of the electronic device 200. Next, the clamp mechanism 300 is slid rearwardly away from the bottom end of the electronic device 600 so that the electronic device 600 is no longer clamped/trapped between the clamp mechanism 300 and the stopper 203. Finally, the electronic device 600 with the screen protector 601 bonded thereto may be removed from the apparatus 1000 and used in the normal manner.

While the invention has been described herein with regard to a manual operation, in other embodiments the operation may be automated. For example, in an alternative embodiment, a user may place the phone with a screen positioned thereon onto the support member 200 and then press an actuation button to have the remaining operations take place. Specifically, upon pressing a button or otherwise activating an actuator, the mechanical actions described above will occur, including clamping the phone in place on the support member 200, tacking the screen to the phone, rolling across the screen to bond the screen to the phone, and then releasing the clamp.

While the invention has been described with respect to specific examples including presently preferred modes of carrying out the invention, those skilled in the art will appreciate that there are numerous variations and permutations of the above described systems and techniques. It is to be understood that other embodiments may be utilized, and structural and functional modifications may be made without departing from the scope of the present invention. Thus, the spirit and scope of the invention should be construed broadly as set forth in the appended claims.

What is claimed is:

1. An apparatus for installing a screen protector on an electronic device, the apparatus comprising:
    a support member comprising an upper support surface extending along a longitudinal axis for supporting an electronic device thereon and a stopper located at a top end of the upper support surface;
    a clamp mechanism slidably coupled to the support member to clamp the electronic device between the clamp mechanism and the stopper;
    a tack assembly comprising a housing having a cavity and a bottom end with an opening, a tack member positioned in the housing, and a release mechanism that supports the tack member in an elevated position within the cavity of the housing, wherein the tack assembly is rotatable relative to the support member between a first position whereby the tack assembly is not aligned with the upper support surface of the support member and a second position whereby the tack assembly is aligned with a portion of the upper support surface of the support member, and wherein upon actuating the release mechanism while the tack assembly is in the second position the tack member falls downwardly within the cavity until a portion of the tack member protrudes through the opening in the bottom end of the housing; and
    a roller assembly comprising a roller member and an actuator, wherein actuation of the actuator causes the roller member to move along the upper support surface of the support member in a direction of the longitudinal axis.

2. The apparatus according to claim 1 wherein the support member is configured to support the electronic device on the upper support surface with a front face of the electronic device facing upwardly away from the upper support surface, and wherein upon positioning the electronic device on the upper support surface the clamp mechanism is slid towards the electronic device to clamp the electronic device in place.

3. The apparatus according to claim 2 wherein after clamping the electronic device in place, the tack assembly is rotated from the first position to the second position whereby the bottom end of the housing of the tack assembly is aligned with and spaced apart from the front face of the electronic device, whereupon the release mechanism is actuated so that the tack member of the tack assembly drops vertically and a portion of the tack member protrudes through the opening in the bottom end of the housing of the tack assembly and contacts a screen protector positioned on the front face of the electronic device to tack the screen protector to the electronic device.

4. The apparatus according to claim 3 wherein after the tack member has been dropped onto the screen protector the tack assembly is rotated from the second position back to the first position, whereupon the actuator of the roller assembly is actuated to cause the roller member to move along the screen protector to bond the screen protector to the front face of the electronic device.

5. The apparatus according to claim 1 wherein the upper support surface of the support member comprises a grippy material that frictionally engages a rear surface of the electronic device to prevent the electronic device from moving laterally when clamped between the clamp mechanism and the stopper, and wherein the upper support surface of the support member comprises a recess within which features on the rear surface of the electronic device nest when the electronic devices is positioned on the upper support surface of the support member.

6. The apparatus according to claim 1 wherein the release mechanism of the tack assembly comprises a latch member that is detachably coupled to an attachment feature of the tack member, and wherein actuating the release mechanism causes the latch member to disengage from the attachment feature of the tack member, thereby causing the tack member to fall onto a screen protector positioned on the electronic device that is positioned on the upper support surface of the support member, during which the tack member falls along an axis that is perpendicular to the screen protector.

7. The apparatus according to claim 6 wherein rotating the tack assembly from the second position back to the first position causes the latch member to automatically engage the attachment feature of the tack member to reattach the latch member to the tack member.

8. The apparatus according to claim 1 wherein the tack member comprises a rubber weight that is elongated in a direction transverse to the longitudinal axis of the upper support surface of the support member.

9. The apparatus according to claim 1 wherein the roller assembly comprises:
    a bearing carrier;
    a gear wheel housed within the bearing carrier, the gear wheel being attached to the actuator so that the gear wheel rotates as the actuator rotates;
    one or more roller member supports attached to the bearing carrier and supporting the roller member; and
    a linear gear that is elongated in the direction of the longitudinal axis, the liner gear being in engagement with the gear wheel; and
    wherein rotation of the actuator causes the gear wheel to ride along the linear gear, which causes the bearing carrier and the roller member to move in the direction of the longitudinal axis during which the roller member is configured to apply a force against a screen protector positioned on the electronic device.

10. The apparatus according to claim 9 further comprising one or more biasing members positioned in the bearing carrier and operably coupled to the one or more roller member supports to bias the roller member downwardly into contact with the screen protector positioned on the electronic device.

11. The apparatus according to claim 1 wherein the support member comprises a first ramped wall at least partially bounding a first side of the upper support surface of the support member and a second ramped wall at least partially bounding a second side of the upper support surface of the support member, the first and second ramped walls being located on opposite sides of the longitudinal axis of the upper support surface and being inclined upwardly in a direction towards the top end of the upper support surface, and wherein the roller member of the roller assembly is configured to roll along the first and second ramped walls during actuation of the actuator.

12. The apparatus according to claim 1 wherein the clamp mechanism comprises a locking member alterable between an unlocked state whereby the clamp mechanism can freely slide relative to the support member in the direction of the longitudinal axis to accommodate electronic devices of varying length on the upper support surface of the support member and a locked state whereby the clamp mechanism is locked into position and slidable movement of the clamp mechanism relative to the support member is inhibited or prevented.

13. The apparatus according to claim 1 further comprising a base assembly that supports the support member in an elevated position, the base assembly comprising a front wall, a rear wall, and first and second sidewalls that collectively define an interior chamber, wherein a gear system of the roller assembly is positioned within the interior chamber of the base assembly.

14. An apparatus for installing a screen protector on an electronic device, the apparatus comprising:
- a base assembly comprising a support member having an upper support surface configured to support an electronic device;
- a clamp mechanism configured to hold the electronic device in a fixed position on the support member;
- a tack assembly movably coupled to the base assembly between a non-use position and a use position, the tack assembly comprising a tack member and a release mechanism that is detachably coupled to the tack member, wherein the release mechanism is alterable between: (1) a non-actuated state in which the release mechanism engages and supports the tack member; and (2) an actuated state in which the release mechanism disengages from the tack member, and wherein when the electronic device with a screen protector positioned thereon is supported on the upper support surface of the support member and the tack assembly is in the use position, altering the release mechanism from the non-actuated state to the actuated state causes the tack member to fall vertically downward into contact with the screen protector to tack the screen protector to the electronic device; and
- a roller assembly comprising a roller member and an actuator, wherein actuation of the actuator causes the roller member to move along and apply a downward force onto the screen protector of the electronic device positioned on the upper support surface of the support member.

15. The apparatus according to claim 14 wherein the roller assembly comprises:
- a gear system that enables the roller member to move along the screen protector of the electronic device in response to actuation of the actuator; and
- one or more biasing members operably coupled to the roller member to bias the roller member downwardly into contact with the screen protector positioned on the electronic device as the roller member moves along the screen protector of the electronic device.

16. The apparatus according to claim 14 wherein the upper support surface of the support member comprises a longitudinal axis, and wherein when the tack assembly is in the use position and the release mechanism is altered from the non-actuated state to the actuated state, the tack member falls downwardly along an axis that is perpendicular to the longitudinal axis of the upper support surface of the support member to tack the screen protector to the electronic device and prevent the screen protector from drifting.

17. The apparatus according to claim 14 wherein the tack assembly further comprises a housing comprising a cavity and a bottom end having an opening, the tack member being located within the cavity of the housing, and wherein altering the release mechanism from the non-actuated state to the actuated state causes the tack member to fall downwardly until at least a portion of the tack member protrudes through the opening in the bottom end of the housing.

18. An apparatus for installing a screen protector on an electronic device, the apparatus comprising:
- a support member comprising an upper support surface configured to support an electronic device;
- a clamp mechanism configured to hold the electronic device in a fixed position on the support member;
- a tack assembly comprising a tack member and an actuator, wherein when the electronic device with a screen protector positioned thereon is supported on the upper support surface of the support member, actuating the actuator of the tack assembly causes the tack member to move downwardly into contact with the screen protector and to apply a perpendicular force onto the screen protector to tack the screen protector to the electronic device; and
- a roller assembly comprising a roller member and an actuator, wherein actuation of the actuator causes the roller member to move along and apply a downward force onto the screen protector of the electronic device positioned on the upper support surface of the support member.

19. The apparatus according to claim 18 wherein the tack assembly is rotatably coupled to the support member between a non-use position and a use position, and wherein when the tack assembly is in the use position the tack member is suspended above the electronic device supported on the support member until the actuator of the tack assembly is actuated.

* * * * *